US007839940B2

(12) United States Patent
Borran et al.

(10) Patent No.: US 7,839,940 B2
(45) Date of Patent: Nov. 23, 2010

(54) ORDERED RETRANSMISSIONS FOR ARQ IN MULTICARRIER SYSTEMS

(75) Inventors: Mohammad Jaber Borran, San Diego, CA (US); Behnaam Aazhang, Houston, TX (US); Prabodh Varshney, Coppell, TX (US)

(73) Assignee: Nokia Corporation, Espoo (FI)

( * ) Notice: Subject to any disclaimer, the term of this patent is extended or adjusted under 35 U.S.C. 154(b) by 1304 days.

(21) Appl. No.: 11/285,590

(22) Filed: Nov. 21, 2005

(65) Prior Publication Data

US 2006/0193391 A1 Aug. 31, 2006

Related U.S. Application Data

(60) Provisional application No. 60/630,333, filed on Nov. 22, 2004.

(51) Int. Cl.
*H04K 1/10* (2006.01)
*H04J 11/00* (2006.01)
*H04L 12/28* (2006.01)
*G08C 25/02* (2006.01)

(52) U.S. Cl. ....................... 375/260; 370/208; 370/394; 714/748

(58) Field of Classification Search ................. 375/260; 370/208, 394
See application file for complete search history.

(56) References Cited

U.S. PATENT DOCUMENTS 6,021,124 A * 2/2000 Haartsen ..................... 370/336
6,373,842 B1 * 4/2002 Coverdale et al. ........... 370/394
7,110,351 B2 * 9/2006 Steer et al. .................. 370/208
7,126,996 B2 * 10/2006 Classon et al. .............. 375/260
7,398,100 B2 * 7/2008 Harris et al. ................ 455/522
2001/0056560 A1 * 12/2001 Khan et al. ................. 714/746
2002/0053058 A1 * 5/2002 Lee et al. ..................... 714/748
2003/0128681 A1 * 7/2003 Rauschmayer .............. 370/338
2003/0189892 A1 * 10/2003 Son et al. .................... 370/208

OTHER PUBLICATIONS

Ahlin, L. et al., "Principles of Wireless Communication", 1998, 2$^{nd}$ Edtion, ISBN 91-44-00762-0, Lund: Studentlitteratur, pp. 234-241.

Ayanoglu, E., "Adaptive ARQ/FEC for Multitone Transmission in Wireless Networks", 1995, IEEE, pp. 2278-2283.

* cited by examiner

*Primary Examiner*—Mohammad H Ghayour
*Assistant Examiner*—Sarah Hassan
(74) *Attorney, Agent, or Firm*—Harrington & Smith

(57) ABSTRACT

A first data symbol that includes a $k^{th}$ data bit is received over a multicarrier system. A first channel quality parameter is estimated for the first data symbol. A second data symbol that includes a retransmitted $k^{th}$ data bit is received. A second channel quality parameter for the second data symbol is estimated. A probable value of the $k^{th}$ data bit is determined based on both the first channel quality parameter and the second channel quality parameter. In response to an ARQ for data symbols communicated over a multicarrier system, the following are performed: determining channel quality parameters, each of the channel quality parameters corresponding to at least one of the transmitted data symbols; selecting a subset of the channel quality parameters exhibiting a worst quality; constructing a block of data symbols corresponding to the subset; and communicating the block of data symbols over a plurality of subcarriers.

25 Claims, 23 Drawing Sheets

SC, 16QAM, SF 4, 4 UpB, 32 PILOTS, OFI, 4 SpC, 2 PSF's, Veh A, 30.0 Km/h,
32-TAP LS, LMMSE, MF, UNCODED, 6 OBpF.

NO ARQ
SEQUENTIAL, MAX 3 ReTxs
ORDERED, MAX 3 ReTxs

SC, 16QAM, SF 4, 4 UpB, 32 PILOTS, OFI, 4 SpC, 2 PSF's, Ped A, 3.0 Km/h, 3-TAP LS, LMMSE, MF, UNCODED, 6.0BpF.

NO ARQ
SEQUENTIAL, MAX 6 ReTxs
ORDERED, MAX 6 ReTxs

ORDERED RETRANSMISSIONS FOR ARQ IN MULTICARRIER SYSTEMS

CROSS-REFERENCE TO RELATED APPLICATIONS

The present invention claims the benefit of U.S. Provisional Patent Application No. 60/630,333, filed on Nov. 22, 2004, the disclosure of which is hereby incorporated by reference.

FIELD

Embodiments of the invention relate to wireless digital communication systems employing automatic repeat request signaling in multicarrier systems.

BACKGROUND

Recently, there has been an increasing interest in looking into Orthogonal Frequency Division Multiplexing (OFDM) transmission methods for wireless cellular systems. OFDM is normally associated with wireless Local Area Network (LAN) systems (e.g., IEEE 802.11a) or Digital Video Transmission (DVB-T). Two drivers behind the use of OFDM for wide-bandwidth (and often high data rate systems) are:

a. The Fourier transform-based modulation of OFDM which allows for the use of simple equalizers such as Zero-Forcing (ZF) or Linear Minimum Mean Squared Error (LMMSE) in OFDM receivers, and b. Inherent frequency diversity in OFDM systems in frequency-selective channels as a result of multicarrier modulation.

The frequency diversity in the OFDM systems can be exploited by encoding the data across frequency subcarriers. Another method to take advantage of the inherent frequency diversity is to spread data symbols across subcarriers using a set of spreading codes as in Direct Sequence Code Division Multiple Access (CDMA) systems. This method, usually referred to as MultiCarrier CDMA (MC-CDMA), can benefit from the potential frequency diversity and improve the raw performance of the system, provided that a Maximum Likelihood (ML) receiver or a sufficiently good suboptimal receiver is used. Systems based on combination of a CDMA scheme and OFDM signaling have been reported. A wideband multicarrier system has been proposed by multiplexing a number of narrowband systems, and different receiver algorithms have been studied for these types of systems.

Automatic Repeat reQuest (ARQ) is a technique that can guarantee reliable communication especially at low SNR, where Forward Error Correction (FEC) coding alone may not be able to provide the required performance. ARQ can be used alone in an uncoded system (i.e., standard ARQ) or together with FEC coding (i.e., hybrid ARQ). A number of different ARQ algorithms have been proposed for OFDM and MC-CDMA systems. In one technique, a maximal ratio combining frequency diversity ARQ scheme is proposed for OFDM systems, in which a different interleaving pattern is used for each retransmission. In another technique, two hybrid ARQ algorithms have been proposed for MC-CDMA systems. In the first algorithm, constellation mapping is rearranged before each retransmission, whereas in the second algorithm, a rearrangement of spreading code assignment is carried out before retransmissions.

SUMMARY

In one embodiment of the invention, a method includes receiving over a multicarrier system a first data symbol $S_1$ that includes a $k^{th}$ data bit and estimating a first channel quality parameter for the first data symbol $S_1$. The method additionally includes receiving over the multi-carrier system a second data symbol $S_2$ that includes a retransmitted $k^{th}$ data bit and estimating a second channel quality parameter for the second data symbol $S_2$. The method also includes determining a probable value of the $k^{th}$ data bit based on both the first channel quality parameter and the second channel quality parameter.

In another illustrative embodiment, a communication device is disclosed that includes a receiver having circuitry configured to receive over a multi-carrier system a first data symbol $S_1$ that includes a $k^{th}$ data bit. The receiver further includes an ordered retransmission module configured to estimate a first channel quality parameter for the first data symbol $S_1$. The circuitry is further adapted to receive over the multi-carrier system a second data symbol $S_2$ that includes a retransmitted $k^{th}$ data bit. The ordered retransmission module is further configured to estimate a second channel quality parameter for the second data symbol $S_2$ and to determine a probable value of the $k^{th}$ data bit based on both the first channel quality parameter and the second channel quality parameter.

In another exemplary embodiment, a method is disclosed including communicating a plurality of data symbols from a transmitter to a receiver in a multicarrier system, the communication using at least one first transmission over a plurality of subcarriers in the multicarrier system. The method further includes, in response to an occurrence of an automatic repeat request (ARQ) associated with the plurality of data symbols, the following: determining a plurality of channel quality parameters, each of the channel quality parameters corresponding to at least one of the transmitted data symbols; selecting a subset of the channel quality parameters exhibiting a worst quality as indicated by the determined channel quality parameters; constructing a block of data symbols from transmitted data symbols corresponding to the subset of channel quality parameters; and communicating the block of data symbols using at least one second transmission over the plurality of subcarriers.

In another exemplary embodiment, a multicarrier communication system includes means for communicating a plurality of data symbols from a transmitter to a receiver, the communication using at least one first transmission over a plurality of subcarriers in the multicarrier system. The system further includes means for responding to an occurrence of an automatic repeat request (ARQ) associated with the plurality of data symbols. The means for responding includes the following: means for determining a plurality of channel quality parameters, each of the channel quality parameters corresponding to at least one of the transmitted data symbols; means for selecting a subset of the channel quality parameters exhibiting a worst quality as indicated by the determined channel quality parameters; means for constructing a block of data symbols from transmitted data symbols corresponding to the subset of channel quality parameters; and means for communicating the block of data symbols using at least one second transmission over the plurality of subcarriers.

In yet another exemplary embodiment, a method is disclosed that includes receiving from a transmitter a plurality of first data symbols using a plurality of subcarriers in a multicarrier system, the first data symbols being received in a plurality of first transmissions over the plurality of subcarriers. The method includes determining a plurality of channel quality parameters, each of the channel quality parameters corresponding to at least one of the first data symbols. The method further includes, when an error is associated with the first data symbols, the following: sending an automatic repeat request to the transmitter; selecting a subset of the channel quality parameters exhibiting a worst quality as indicated by the determined channel quality parameters; using the subset of the channel quality parameters, determining a corresponding subset of the first data symbols; in response to at least one second transmission over the plurality of subcarriers, receiving a block of second data symbols corresponding to the subset of first data symbols; and using at least the first and second data symbols to determine values corresponding to the first data symbols in the subset of first data symbols.

In an illustrative embodiment, a communication device includes a receiver including circuitry configured to receive a plurality of first data symbols using a plurality of subcarriers in a multicarrier system, the first data symbols being received in a plurality of first transmissions over the plurality of subcarriers. The receiver further includes a decoder configured to determine at least one error associated with the first data symbols. The communication device further includes transmitter configured in response to the error determination to transmit an automatic repeat request. The receiver further includes an ordered retransmission module responsive to the error determination. The ordered retransmission module is configured to determine a plurality of channel quality parameters, each of the channel quality parameters corresponding to at least one of the first data symbols. The ordered retransmission module is further configured to select a subset of the channel quality parameters exhibiting a worst quality as indicated by the determined channel quality parameters. The ordered retransmission module is further configured, using the subset of the channel quality parameters, to determine a corresponding subset of the first data symbols. The circuitry is further configured, responsive to at least one second transmission over the plurality of subcarriers, to receive a block of second data symbols corresponding to the subset of first data symbols. The ordered retransmission module is further configured to use at least the first and second data symbols to determine values corresponding to the first data symbols in the subset of first data symbols.

In an exemplary embodiment, a signal bearing medium is disclosed that tangibly embodies a program of machine-readable instructions executable by a digital processing apparatus to perform operations including determining a plurality of channel quality parameters, each of the channel quality parameters corresponding to at least one of a plurality of first data symbols received using a plurality of subcarriers in a multicarrier system, the first data symbols being received in a plurality of first transmissions over the plurality of subcarriers. The operations further include, in response to an error being associated with the first data symbols, the following: selecting a subset of the channel quality parameters exhibiting a worst quality as indicated by the determined channel quality parameters; using the subset of the channel quality parameters, determining a corresponding subset of the first data symbols; and using at least second data symbols to determine values corresponding to the first data symbols in the subset of first data symbols, the second data symbols received in a block and corresponding to the subset of first data symbols.

In another exemplary embodiment, a method is disclose that includes transmitting a plurality of first data symbols to a receiver using a plurality of subcarriers in a multicarrier system, the first data symbols transmitted using a plurality of first transmissions over the subcarriers. The method includes receiving from the receiver subcarrier information corresponding to the subcarriers used to transmit the first data symbols, the subcarrier information further corresponding to a plurality of channel quality parameters, each of the channel quality parameters corresponding to at least one of the first data symbols. The method also includes using the subcarrier information, selecting a subset of the first data symbols that corresponds to a worst quality as indicated by the channel quality parameters. The method additionally includes constructing a block of second data symbols from the first data symbols in the subset of first data symbols, and transmitting the block of second data symbols using at least one second transmission over the plurality of subcarriers.

In an illustrative embodiment, a communication device is disclosed that includes a transmitter including circuitry configured to transmit a plurality of first data symbols using a plurality of subcarriers in a multicarrier system, the first data symbols transmitted using a plurality of first transmissions over the subcarriers. The communication device includes a receiver configured to receive subcarrier information corresponding to the subcarriers used to transmit the first data symbols, the subcarrier information further corresponding to a plurality of channel quality parameters, each of the channel quality parameters corresponding to at least one of the first data symbols. The transmitter further includes an ordered retransmission module configured to use the subcarrier information to select a subset of the first data symbols that corresponds to a worst quality as indicated by the channel quality parameters. The ordered retransmission module further configured to construct a block of second data symbols from the first data symbols in the subset of first data symbols. The circuitry is further configured to transmit the block of second data symbols using at least one second transmission over the plurality of subcarriers.

In another exemplary embodiment, a signal bearing medium is disclosed that tangibly embodies a program of machine-readable instructions executable by a digital processing apparatus to perform operations including using subcarrier information to select a subset of a plurality of first data symbols that corresponds to a worst quality as indicated by channel quality parameters, where the plurality of first data symbols are transmitted using a plurality of subcarriers in a multicarrier system, and the first data symbols transmitted using a plurality of first transmissions over the subcarriers, wherein the subcarrier information is received and corresponds to the subcarriers used to transmit the first data symbols. The subcarrier information further corresponds to a plurality of channel quality parameters, each of the channel quality parameters corresponding to at least one of the first data symbols. The operations further include constructing a block of second data symbols from the first data symbols in the subset of first data symbols, and causing the block of second data symbols to be transmitted using at least one second transmission over the plurality of subcarriers.

BRIEF DESCRIPTION OF THE DRAWINGS

The present invention is described below more particularly with reference to the following drawing figures, which are not to scale except where stipulated.

DETAILED DESCRIPTION

The present disclosure is separated into a number of different sections for ease of reference.

Overview

A multicarrier system transmits on more than one subcarrier, and the frequency selective nature of the multipath channel causes different subcarriers of the multicarrier system to experience different channel conditions. Multicarrier systems typically transmit a frame made up of blocks of data symbols, where one or more data symbols of a block are transmitted on a subcarrier. Certain existing ARQ algorithms for OFDM and MC-CDMA systems retransmit the whole frame at each retransmission. As a result, the data symbols in the subcarriers with good channel conditions are unnecessarily retransmitted over and over. Even though interleaving or rearrangement techniques described above improve the performance by assigning subcarriers with better channel conditions to different data symbols at different retransmissions, these techniques do not eliminate the overhead of the unnecessary retransmissions of the data symbols that are already detected with high reliability. These unnecessary retransmissions result in lower throughput. On the other hand, retransmission of a fraction of a frame does not necessarily reduce the overhead if the retransmitted subcarriers are chosen arbitrarily, or e.g., sequentially. Therefore, there are problems associated with typical ARQ schemes in multicarrier systems.

Herein, we study different ARQ algorithms for a wideband system. We consider standard ARQ algorithms with and without channel state information at the transmitter. We present an ordered retransmission technique that significantly outperforms the sequential retransmission. The signal and channel models as well as the system models for narrowband and wideband systems are presented below under separate subheadings. The Channel Quality and Equivalent Channel Notions section below defines the notions of channel quality and equivalent channel quality, which will be used in the maximal ratio combining of the received signals in OFDM and MC-CDMA systems. The ARQ Algorithms section describes the ARQ algorithms and presents numerical results on the achievable throughputs.

Figure 1:
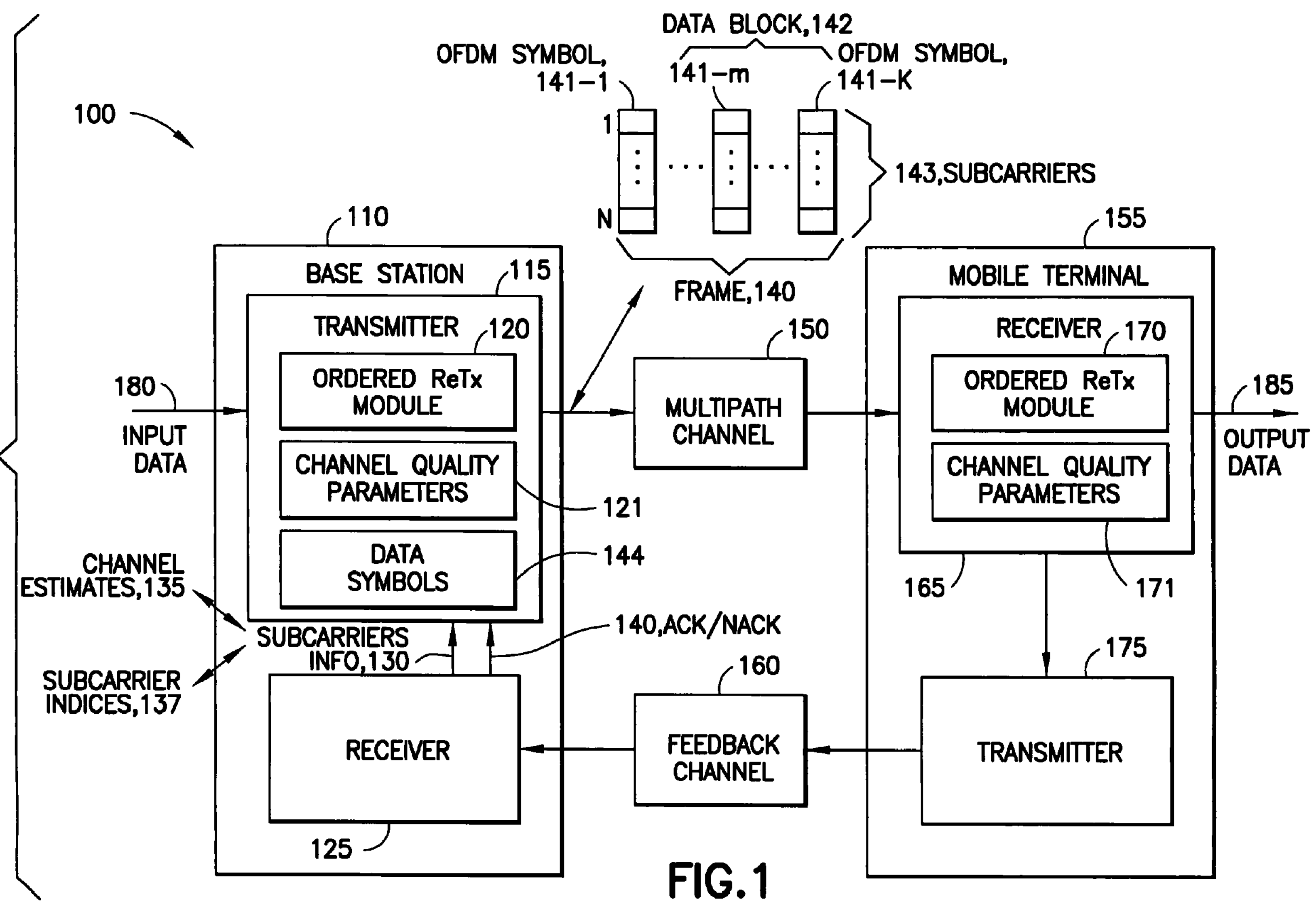
FIG. 1 is a block diagram of an exemplary multicarrier communication system.

Before proceeding with a more detailed explanation of the disclosed invention, it is helpful at this point to present a high-level view of a communication system operating in accordance with an exemplary embodiment of the disclosed invention. FIG. 1 shows a high-level block diagram of a multicarrier communication system 100 including a base station 110 communicating with a mobile terminal 155 over a multipath channel 150 and a feedback channel 160. The base station 110 comprises a transmitter 115 and a receiver 125. The transmitter 115 includes an ordered retransmission module 120, channel quality parameters 121, and data symbols 144. The mobile terminal 155 includes a receiver 165 and a transmitter 175. The receiver 165 includes an ordered retransmission module 170 and channel quality parameters 171.

The transmitter 115 of the base station 110 accepts input data 180 (typically a bit stream), converts the input data 180 into data symbols 144 (e.g., modulated symbols), and communicates the data symbols 144 over the multipath channel 150 to the mobile terminal 155. The transmitter 115 communicates using a number of subcarriers 143, and one or more of the data symbols 144 may be communicated using a single subcarrier 143. OFDM symbols 141-1 through 141-*k* are transmitted in a frame 140. In a "pure" OFDM system (called an "OFDM" system herein), each data symbol 144 would be transmitted on a single subcarrier 143. In an MC-CDMA system, a data symbol 144 will be transmitted on multiple subcarriers 143 as explained in more detail in reference to FIG. 2.

The receiver 165 of the mobile terminal 155 receives the frame 140 and determines output data 185, typically a bit stream, therefrom. In an exemplary embodiment, the ordered retransmission module 170 determines subcarrier information 130 that is communicated to the transmitter 175 and through the feedback channel 160 to the receiver 125. The ordered retransmission module 170 (or some other part of receiver 170) in this example may also cause Ack/Nack (acknowledge, no acknowledge) information 140 to be communicated to the transmitter 175 and through the feedback channel 160 to the receiver 125. The disclosed invention attempts to improve throughput for those times when errors are determined (e.g., a Nack would be communicated to the base station 110 using the Ack/Nack information 145) by ordering data symbols 144 in order of their channel quality parameters and to retransmit a certain number of data symbols 144 having the lowest quality parameters as per the order. The data symbols 144 are transmitted in a data block 142, which comprises in an exemplary embodiment a number of OFDM symbols 141 (e.g., OFDM symbols 141-*m* through 141-*k*). In the descriptions below, one or three OFDM symbols 141 make up a data block 142, although this is not a requirement. Thus, a data block 142 could comprise N data symbols 144, or any other subset (less than N times k) of the N times k subcarriers 143 and the transmissions thereon.

Embodiments of the invention may be implemented in a number of ways. In a first exemplary approach, the receiver 165 sorts the subcarriers 143 used in the frame 140 in the order of their channel quality parameters 171 and sends (through the feedback channel 160) the subcarrier indices 137 of the subcarriers with the worst channel qualities to the transmitter. As described in more detail below, there are N by k times the subcarriers 143 are used in the frame 140, and the use of the subcarriers 143 in the frame 140 can be indexed so that the receiver 156 and transmitter 115 can select data symbols 144 for retransmission based on the index of the subcarriers 143. In other words, if subcarrier one of frame 141-2 has one of the worst channel qualities, an index that uniquely defines the transmission of this subcarrier can be sent.

In a second exemplary approach, the receiver 165 sends (through the feedback channel 160) the channel estimates 135 (e.g., the estimate of the impulse response of the channel or other channel estimates, although the estimate of the impulse is usually more compact than other channel estimates) to the transmitter 115. The transmitter 115 then calculates channel quality parameters 121 from the channel estimates 135 and sorts the subcarriers 143 (e.g., and respective data symbols 144) in terms of channel qualities (e.g., values of the channel quality parameters 121). In both of these exemplary approaches, the transmitter 115 constructs a data block 142 from the data in the subcarriers 143 with the worst channel qualities and retransmits the data block 142 to the receiver 165 using one or more OFDM symbols 141.

In OFDM systems, one subcarrier 143 corresponds to one data symbol 144. In an OFDM system, channel quality parameters are determined for each subcarrier (see, e.g., equation [34] below). Therefore each channel quality parameter corresponds to a single data symbol 144. When a retransmission occurs, the channel quality parameters can be combined (see, e.g., equations [37] and [42] below) as can the received signals (see, e.g., equations [38] and [43] below) in order to determine (see, e.g., equation [40] below) bit values for the data symbols 144 received at the receiver. In an MC-CDMA system, a subcarrier 143 corresponds to a number (streams J in FIG. 2 below) of subcarriers 143. In an MC-CDMA system, channel quality parameters 121 and received signals can be determined per chip (see, e.g., equations [56] and [57] below) and then can be combined (see, e.g., equations [58] and [59] below). In addition, an equivalent channel quality parameter can be determined for each stream of subcarriers (see, e.g., equation [64] below), and the streams of subcarriers are ranked according to the equivalent channel quality parameters. A channel quality parameter 121 then corresponds (as an equivalent channel quality parameter) to multiple data symbols 144. In MC-CDMA system, the equivalent channel quality parameters can be combined in response to a retransmission of the data symbols 144. The combination can be performed using the data of equation [64] in equations [37] and [42]. When the channel quality parameters are determined for subcarriers 143, the channel quality parameters correspond to channel quality determined for one or more subcarriers 143 per transmission (e.g., OFDM symbol 141). In other words, if there are N subcarriers 143 and k transmissions (e.g., OFDM symbols 141), then N times k channel quality parameters should be determined for an OFDM system and N times k divided by J channel quality parameters for an MC-CDMA system.

System Model

In this section, we present the system models that we will use throughout this disclosure. First we present the signal and channel model equations for a general multi-carrier system including Orthogonal Frequency Division Multiplexing (OFDM) and multi-carrier CDMA (MC-CDMA) system. After that, we review the basic MC-CDMA system model as proposed in S. Kaiser, "OFDM-CDMA versus DS-CDMA: Performance evaluation for fading channels," in *Proceedings of the International Conference on Communications,* 1995, pp. 1722-1726. Then we present the narrowband and wideband multi-carrier system models that will be considered in this work. The system model considered in this work is described particularly in the sections entitled Signal and Channel Models, Basic MC-CDMA System, Narrowband System Model, and Wideband System Model.

Signal and Channel Models

Continuous-Time Signal Model

Consider a multi-carrier system with N subcarriers, OFDM symbol duration of $T_O$=NT, and a total bandwidth of $$B = \frac{1}{T} = \frac{N}{T_O}.$$

Denote, by $S=[S_0, \ldots, S_{N-1}]^T$, the vector containing the transmitted information. Then we will have the following baseband expression for the transmitted signal:

$$s(t) = \sum_{n=0}^{N-1} S_n e^{-j\frac{2\pi nt}{NT}}. \quad [1]$$

In practice, a discrete time signal is usually generated using an inverse discrete Fourier transform, and then a pulse-shaping filter is used to generate the continuous-time signal with the desired bandwidth and pulse shape. Assuming a pulse-shaping filter with the impulse response q(t), the following continuous-time expression is meant to be approximated:

$$x(t)=\int s(\tau)q(t-\tau)d\tau. \quad [2]$$

If $q=[q_0, \ldots, q_{L_f-1}]^T$ is the discrete-time representation of the pulse-shaping filter at a sampling period of $$T_s < \frac{T}{2},$$

then using the sampling theorem, the normalized continuous-time representation of the filter will be $$q(t) = \frac{1}{T_s}\sum_{n=0}^{L_f-1} q_n \mathrm{sinc}\left(\frac{t-nT_s}{T_s}\right), \quad [3]$$

and the convolution in equation [2] can be written as $$x(t) = \int\left(\sum_{n=0}^{N-1} S_n e^{j\frac{2\pi n\tau}{NT}}\right)\left(\frac{1}{T_s}\sum_{l=0}^{L_f-1} q_l \mathrm{sinc}\left(\frac{t-\tau-lT_s}{T_s}\right)\right)d\tau. \quad [4]$$
$$= \frac{1}{T_s}\sum_{l=0}^{L_f-1} q_l \sum_{n=0}^{N-1} S_n \int e^{j\frac{2\pi n\tau}{NT}} \mathrm{sinc}\left(\frac{t-\tau-lT_s}{T_s}\right)d\tau$$

The sinc function in the above convolution expression is an ideal low-pass filter with a bandwidth $$B_f = \frac{1}{2T_s} > \frac{1}{T} = B.$$

Since all of the frequency components in the exponential terms lie in the pass band of the filter, we will have $$\frac{1}{T_s}\int e^{j\frac{2\pi n\tau}{NT}} \mathrm{sinc}\left(\frac{t-\tau}{T_s}\right)d\tau = e^{j\frac{2\pi n\tau}{NT}} \quad [5]$$

and therefore $$x(t) = \sum_{l=0}^{L_f-1} q_l \sum_{n=0}^{N-1} S_n e^{j\frac{2\pi n(t-lT_s)}{NT}}. \quad [6]$$

Discrete-Time Signal Model

The goal at the transmitter is to generate samples of the above signal at a sample interval of $T_s$. If we denote this discrete-time signal by vector $x=[x_0, \ldots, x_{M-1}]^T$, we will have $$x_m = \sum_{l=0}^{L_f-1} q_l \sum_{n=0}^{N-1} S_n e^{j\frac{2\pi n(m-l)T_s}{NT}} \quad [7]$$
$$\text{for } m = 0, \ldots, M-1.$$

If, for simplicity, we assume that $T=KT_s$ with $K>2$, we will have $$x_m = \sum_{l=0}^{L_f-1} q_l \sum_{n=0}^{N-1} S_n e^{j\frac{2\pi n(m-l)}{KN}} \quad [8]$$
$$\text{for } m = 0, \ldots, KN-1$$

Now if we define $$\tilde{s}_m = \sum_{n=0}^{N-1} S_n e^{j\frac{2\pi nm}{KN}},$$

we will have $$x_m = \sum_{l=0}^{L_f-1} q_l \tilde{s}_{m-l} \quad [9]$$
$$\text{for } m = 0, \ldots, KN-1,$$

which is a discrete convolution. The discrete signal $\tilde{s}$ can be viewed as the inverse discrete Fourier transform of the vector $\tilde{S}$ defined as $$\tilde{S} = [S_0, \ldots, S_{N-1}, \underbrace{0, \ldots, 0}_{(K-1)N}]^T. \quad \text{Equation [9]}$$

suggests that to generate the discrete filtered signal, the impulse response of the filter should be convolved with an upsampled time-domain signal which is generated by zero-padding in frequency domain followed by an inverse discrete Fourier transform.

Channel Model and Received Signal

We consider a multipath channel with the impulse response given by $$h(t) = \sum_{p=0}^{P-1} \alpha_p \delta(t-\tau_p), \quad [10]$$

where P is the number of channel paths, $\alpha_p$ and $\tau_p$ denote the coefficient and delay of the $p^{th}$ path, and $\delta(.)$ is the Dirac delta function. The discrete-time signal in equation [9] is interpolated and transmitted over this multipath channel by modulating the carrier signal. If we denote by g(t) the interpolation function, the baseband transmitted signal will be given by $$x(t) = \sum_{n=0}^{KN-1} x_n g\left(\frac{t - nT_s}{T_s}\right). \quad [11]$$

Denoting by y(t) and υ(t) the received signal and the additive noise at the receiver, we will have $$\begin{aligned} y(t) &= \int_{-\infty}^{+\infty} x(\tau)h(t-\tau)d\tau + \upsilon(t) \\ &= \int_{-\infty}^{+\infty} x(\tau)\sum_{p=0}^{P-1}\alpha_p\delta(t-\tau-\tau_p)d\tau + \upsilon(t) \\ &= \sum_{p=0}^{P-1}\alpha_p x(t-\tau_p) + \upsilon(t) \\ &= \sum_{p=0}^{P-1}\alpha_p \sum_{n=0}^{KN-1} x_n g\left(\frac{t-\tau_p-nT_s}{T_s}\right) + \upsilon(t) \\ &= \sum_{n=0}^{KN-1} x_n \sum_{p=0}^{P-1}\alpha_p g\left(\frac{t-\tau_p-nT_s}{T_s}\right) + \upsilon(t). \end{aligned} \quad [12]$$

In order to obtain a discrete time signal, the receiver samples this signal at a sampling rate $$f_r\left(\text{sample interval } T_r = \frac{1}{f_r}\right).$$

According to the sampling theorem, the sampling rate has to be larger than the Nyquist rate to prevent aliasing. Therefore, we should have $f_r > 2B$ or $$T_r < \frac{T}{2}.$$

Denoting by $y = [y_0, \ldots, y_{M-1}]^T$ the discrete (sampled) received signal, we have $$y_m = \sum_{n=0}^{KN-1} x_n \sum_{p=0}^{P-1}\alpha_p g\left(\frac{mT_r-\tau_p-nT_s}{T_s}\right) + \upsilon(mT_r) \quad \text{for } m = 0, \ldots, M-1. \quad [13]$$

Now, for simplicity, assume that $T_r = T_s$. With this assumption we will have $$y_m = \sum_{n=0}^{KN-1} x_n \sum_{p=0}^{P-1}\alpha_p g\left(\frac{(m-n)T_s-\tau_p}{T_s}\right) + \upsilon(mT_s) \quad \text{for } m = 0, \ldots, KN-1. \quad [14]$$

Defining $$h_m = \sum_{p=0}^{P-1}\alpha_p g\left(\frac{mT_s-\tau_p}{T_s}\right)$$

and $\upsilon_m = \upsilon(mT_s)$, we will have $$y_m = \sum_{n=0}^{KN-1} x_n h_{m-n} + \upsilon_m \text{ for } m = 0, \ldots, KN-1. \quad [15]$$

We denote the length of the discrete channel h by L. Equations [9] and [15] are discrete convolutions, and with an appropriate cyclic prefix (of length at least equal to $L+L_f-1$), can be converted to a circular convolution. In the rest of this disclosure, we will assume that such a cyclic prefix is inserted at the transmitter before passing the discrete time-domain signal through the pulse-shaping filter. Therefore, the convolutions in equations [9] and [15] are equivalent to multiplications in the frequency domain, i.e.

$$Y_k = X_k H_k + N_k = \tilde{S}_k Q_k H_k + N_k \text{ for } k=0, \ldots, NK-1, \quad [16]$$

where Y, X, $\tilde{S}$, Q, H, and N are the KN-point discrete Fourier transforms of the vectors y, x, $\tilde{s}$, q, h, and υ, respectively. Since $\tilde{S}_k = 0$ for $k \geqq N$ there is no information about the signal or channel in the corresponding elements of the vector Y, and the receiver can discard those elements, and since $\tilde{S}_k = S_k$ for k=0, N−1, the receiver can use the following equation $$Y_k = S_k Q_k H_k + N_k \text{ for } k=0, \ldots, N-1. \quad [17]$$

In the rest of this work, we will combine the transmit pulse shaping filter and the channel in a single variable H, and will use the following equation to describe the system in frequency domain:

$$Y_k = H_k S_k + N_k \text{ for } k=0, \ldots, N-1. \quad [18]$$

We also denote the variance of the additive noise, $N_k$, by $\sigma^2$.

Basic MC-CDMA System

Figure 2A:
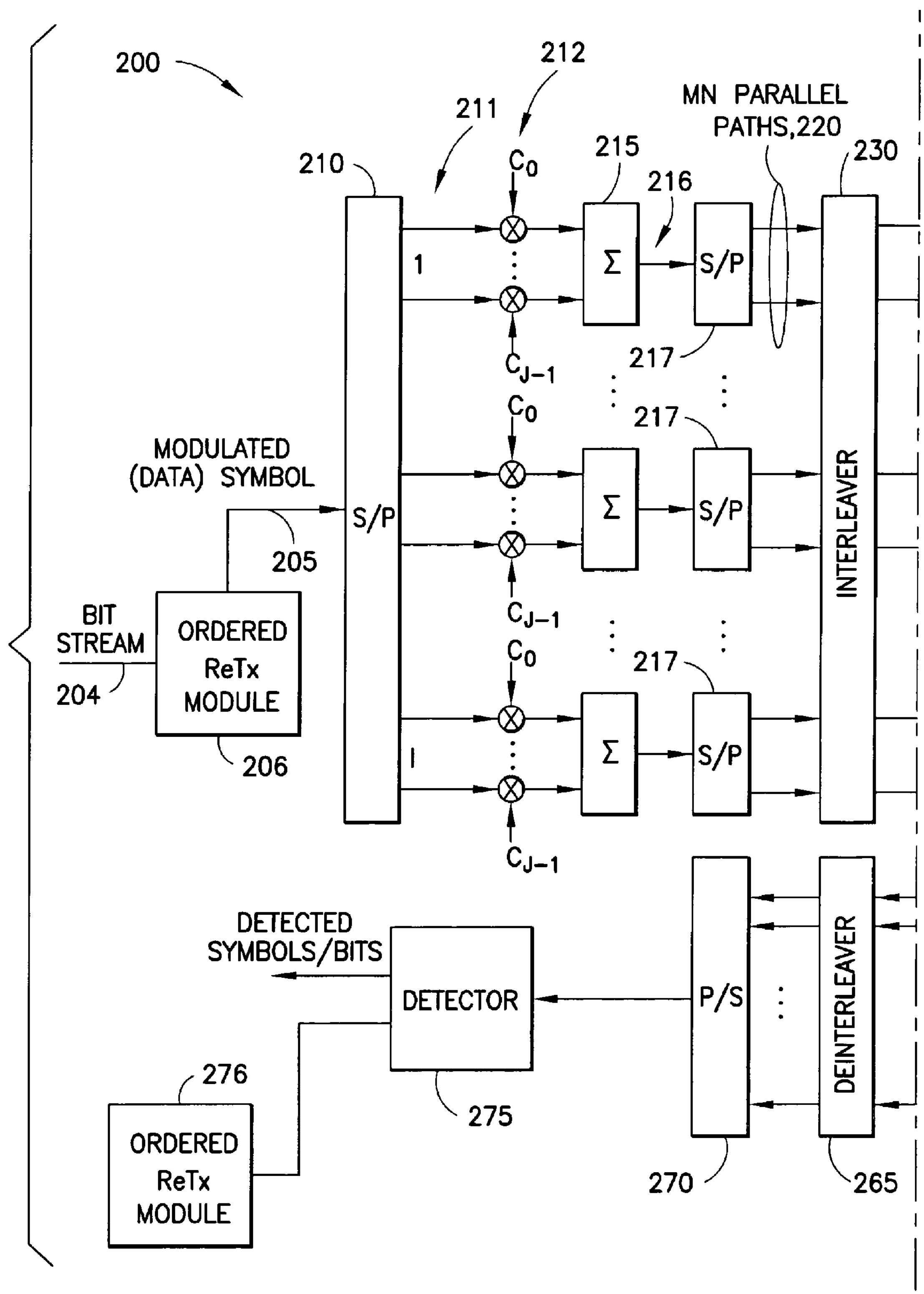
FIG. 2 is a block diagram of an exemplary basic MC-CDMA system.
Figures 2, 2B:
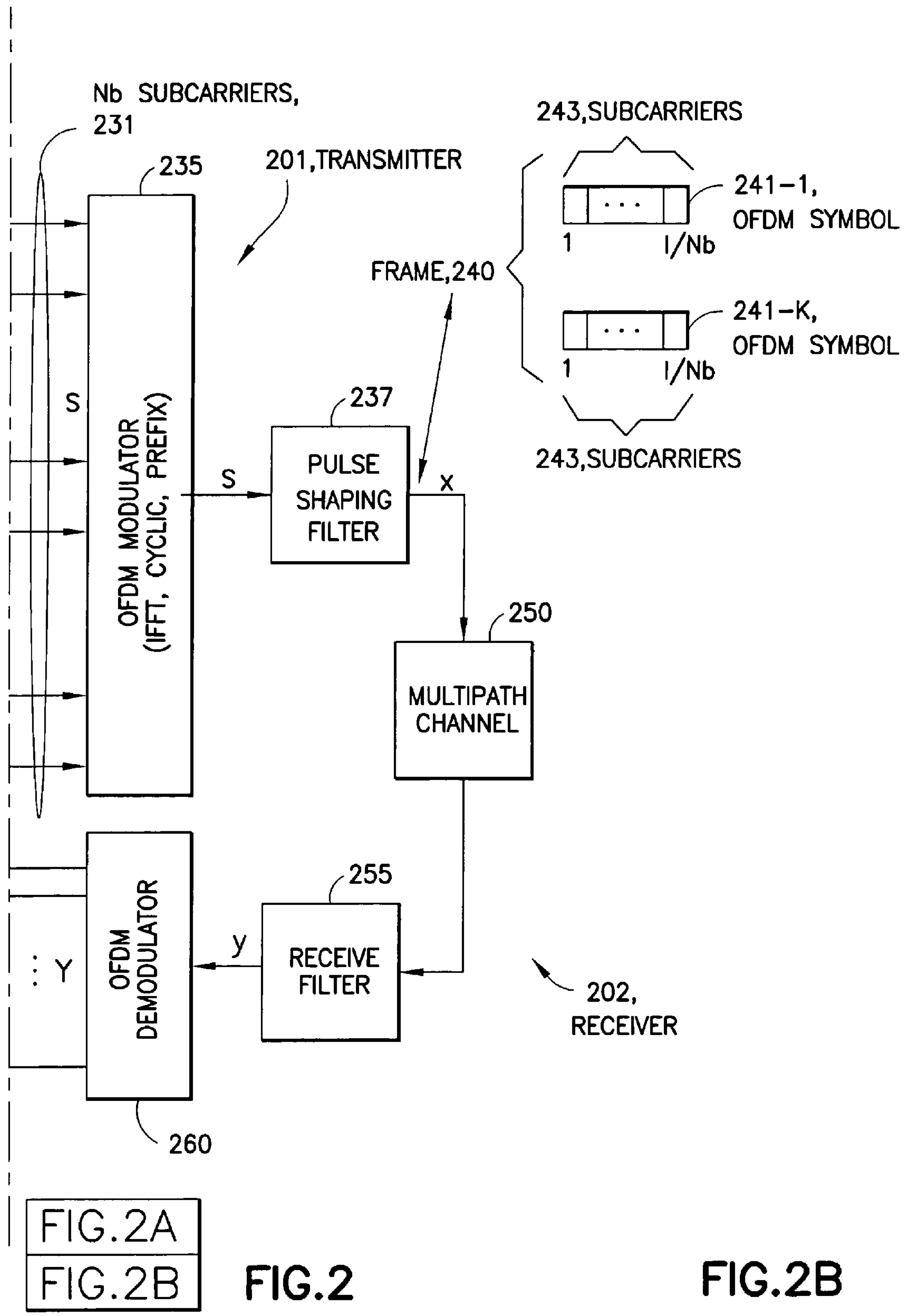

FIG. 2 shows a block diagram of the basic MC-CDMA system 200 as described in S. Kaiser, "OFDM-CDMA versus DS-CDMA: Performance evaluation for fading channels," cited above. The MC-CDMA system 200 comprises a transmitter 201 communicating with a receiver 202 over a multipath channel 250. The modulated symbol stream 205 (e.g., comprising data symbols) at the input of the system is split by a serial-to-parallel converter 210 into I sections 211 of J streams 212. Inside each section 211, the streams are spread using Walsh-Hadamard codes of length $N_c$, and then summed up using adders 215 to form a single spread stream 216. The spread streams 216 at the outputs of the sections 211 are then passed through a serial-to-parallel converter 217 to create MN parallel paths 220. The MN parallel paths 220 are then interleaved using interleaver 230, which creates Nb subcarriers 231. After that, the frequency-domain signal is converted to a time-domain OFDM symbol using an OFDM modulator 235, e.g., an Inverse Fast Fourier Transform (IFFT) module. A cyclic prefix of appropriate length is added to the time-domain signal at the output of IFFT to prevent Inter-Symbol and Inter-Channel Interferences (ISI and ICI). This time-domain signal, S, is then passed through the pulse-shaping filter 237 to create signal X and is transmitted over the multipath channel 250.

At the receiver 202, the signal is first passed through a bandpass receive filter 255 (e.g., the receive filter 255 can be same as the pulse-shaping filter 237 or, more accurately, a filter matched to the pulse-shaping filter 237) to suppress the out-of-band noise and interference. After the receive filter 255, the signal is passed through an OFDM demodulator 260 (e.g., an FFT) and then deinterleaved using deinterleaver 265 and converted to serial (using parallel-to-serial converter 270) to form the spread streams corresponding to the transmitter sections 211. Inside each section 211 at the receiver, a multi-user detector 275 is used to generate soft or hard decision outputs for each original symbol (e.g., bit) stream 280. It should be noted that the number of bits carried by a modulated symbol 205 is dependent on the modulation scheme being used. A detailed description of different receiver algorithms for this multi-carrier system 200 can be found in: N. Yee, J. P. Linnartz and G. Fettweis, "Multicarrier CDMA in Indoor Wireless Radio Networks," *Proc. of IEEE PIMRC* 1993, Yokohama, Japan, September 1993, pp. 109-113, and references therein.

While S. Kaiser, "OFDM-CDMA versus DS-CDMA: Performance evaluation for fading channels," cited above, describes some of the system 200 of FIG. 2, Kaiser does not describe certain items in FIG. 2. In particular, Kaiser does not describe the ordered retransmission modules 206, 276 and the frame 240. The ordered retransmission module 206 performs operations to create an OFDM symbol 241 in response to a Nack from the receiver 202 (e.g., and its associated transmitter, not shown in FIG. 2). In the example of FIG. 2, the ordered retransmission module 206 is between a bit stream and modulated symbol stream 205 (the modulator not shown in FIG. 2) and is used to store data symbols for retransmission (e.g., or to control retransmission of stored data symbols). The ordered retransmission module 276 performs operations to utilize an OFDM symbol 241 sent by the transmitter 201 in response to a Nack from the receiver 202. Additionally, an exemplary frame 240 is shown as an example of how data symbols from the modulated symbol stream 205 would be transmitted over the multipath channel 250. In this example, a frame 240 includes OFDM symbols 241-1 through 241-*k*. Each OFDM symbol 241 is transmitted on I (same as Nb) subcarriers 243. A particular data symbol from the modulated symbol stream 205 will be transmitted on J subcarriers 243 in FIG. 2. It should be noted that the locations of modules 206 and 276 are merely exemplary.

Now we present exemplary narrowband and wideband systems constructed based on the above basic model.

Narrowband System Model

Figure 3:
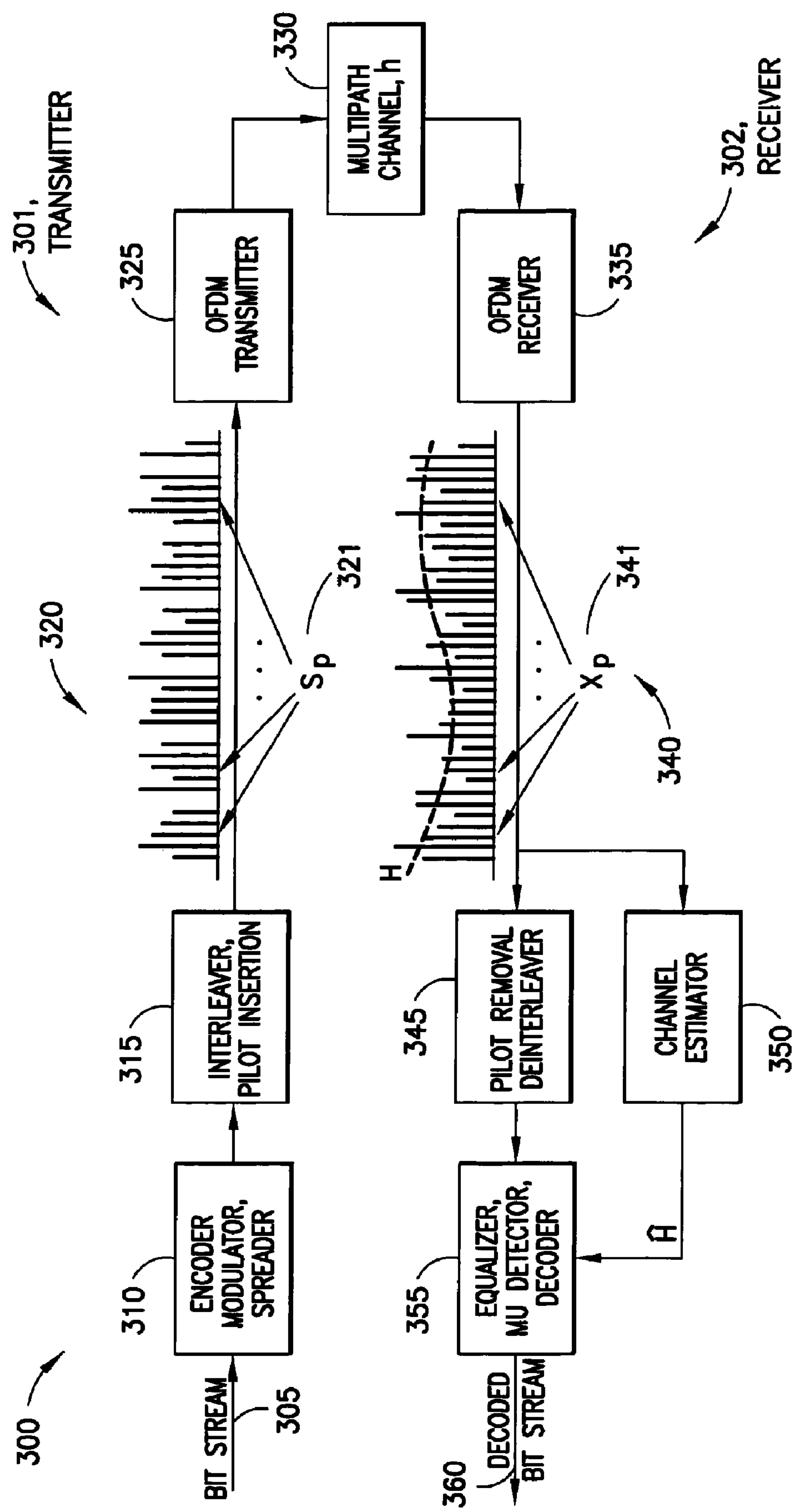
FIG. 3 is a high level block diagram of an exemplary narrowband MC-CDMA system.

A block diagram of an exemplary narrowband MC-CDMA system 300 is shown in FIG. 3. A transmitter 301 is communicating with a receiver 302 over a multipath channel 330 having a channel vector, h. The bit stream 305 is operated on by an encoder, modulator, spreader module 310, then by interleaver and pilot insertion module 315. As we see in this figure, a number of pilot symbols 321 are inserted in the frequency domain signal 320 before the OFDM transmitter module 325. At the receiver 302, the frequency domain observations at pilot positions 341 can be used to estimate the unknown channel. The receiver 302 comprises an OFDM receiver module 335 that creates the frequency domain signal 340 having the received pilot symbols 341. The receiver 302 also comprises a pilot removal, deinterleaver module 345, a channel estimator module 350 (creating an estimate of the channel frequency response, $\hat{H}$, of the multipath channel 330), and an equalizer, MU detector, and decoder module 355. The receiver produces a decoded bit stream 360. In the example of FIG. 3, the ordered retransmission module 120 (not shown in FIG. 3) would typically be comprised in or communicate with module 310. The ordered retransmission module 170 (not shown in FIG. 3) would typically be comprised in or communicate with module 355.

Denoting by F the first N rows of the KN-point discrete Fourier transform matrix $$\left(\text{i.e., } F_{kn} = e^{-j\frac{2\pi kn}{KN}} \text{ for } k = 0, \ldots, N-1 \text{ and } n = 0, \ldots, KN-1\right),$$

and denoting by W the first L columns of F, we will have H=Wh. If we further define the L×P matrix G as $$G_{lp} = g\left(\frac{lT_s - \tau_p}{T_s}\right)$$

and the vector $\alpha=[\alpha_0, \ldots, \alpha_{P-1}]^T$, we can write h=Gα and $$H=WG\alpha. \quad [19]$$

Next assume for example that $N_p$ pilots 321 are inserted in the original data vector S at positions $p_1, \ldots, p_{N_p}$, and that each pilot 321 has zero phase and magnitude $\sqrt{P_p}$ (i.e., $S_k=\sqrt{P_p}$ for $k=p_1, \ldots, p_{N_p}$). Denote by $W_p$ the $N_p\times L$ matrix constructed from those rows of W corresponding to the pilot positions (i.e., rows $p_1, \ldots, p_{N_p}$). Also, denote by $Y_p$, $Q_p$, and $N_p$ the vectors constructed from the corresponding elements of Y, Q, and N, respectively. With these notations, we will have $$Y_p=\sqrt{P_p}\,\text{diag}(Q_p)W_pG\alpha+N_p, \quad [20]$$

where diag(.) denotes the diagonal matrix constructed from the elements of its argument vector.

The receiver 302 (e.g., the channel estimator module 350) will use the above equation to estimate the channel impulse response. If we assume that the delays $\tau_0, \ldots, \tau_{p-1}$, are known at the receiver 302 (e.g., have been estimated separately), then the matrix G is known, and the receiver 302 can estimate the vector α based on the observations $Y_p$. If the delays are not known, then the receiver 302 (e.g., the channel estimator module 350) has to estimate both the delays and the amplitudes of the channel paths of the multipath channel 330. Alternatively, the channel estimator module 350 can consider the vector h=Gα as the unknown vector to be estimated. In that case, for Bayesian estimators, the a priori statistics of h should be first calculated from the joint statistics of $(\tau_0, \ldots, \tau_{p-1}, \alpha_0, \ldots, \alpha_{p-1})$.

Depending on the amount of receiver knowledge about the statistics of the channel 330 and additive noise, the receiver can use different estimation algorithms to estimate the unknown channel. If the statistics of channel 330 and noise are not known at the receiver 302, the receiver 302 (e.g., the channel estimator module 350) can use a Least Squares (LS) estimator. If only statistics of noise are known at the receiver, the channel estimator module 350 can use a Maximum Likelihood (ML) estimator, and if the statistics of both noise and channel are known, the channel estimator module 350 can use a Minimum Mean Squared Error (MMSE) estimator. In the examples that follow, we will assume that the statistics of the channel 330 are not known at the receiver 302. In these non-limiting examples, we will further assume that the additive noise in time domain is white and Gaussian, with zero mean and variance $$\frac{\sigma^2}{KN},$$

and that this information is available at the receiver 302. The factor $$\frac{1}{KN}$$

in the noise variance is for the normalization factor, which is intentionally missing from our discrete Fourier transform matrices. With the Gaussian assumption on the additive noise, the ML estimator (which, in this case, is the same as the LS estimator) of the discrete channel vector h is a linear estimator given by $$\hat{h} = \frac{1}{\sqrt{P_p}}\left[W_p^H \mathrm{diag}(Q_p)^H \mathrm{diag}(Q_p) W_p\right]^{-1} W_p^H \mathrm{diag}(Q_p)^H Y_p. \quad [21]$$

Having estimated the channel impulse response, we can find the estimate of the channel frequency response H as $$\hat{H}=W\hat{h}. \quad [22]$$

Wideband System Model

Figure 4:
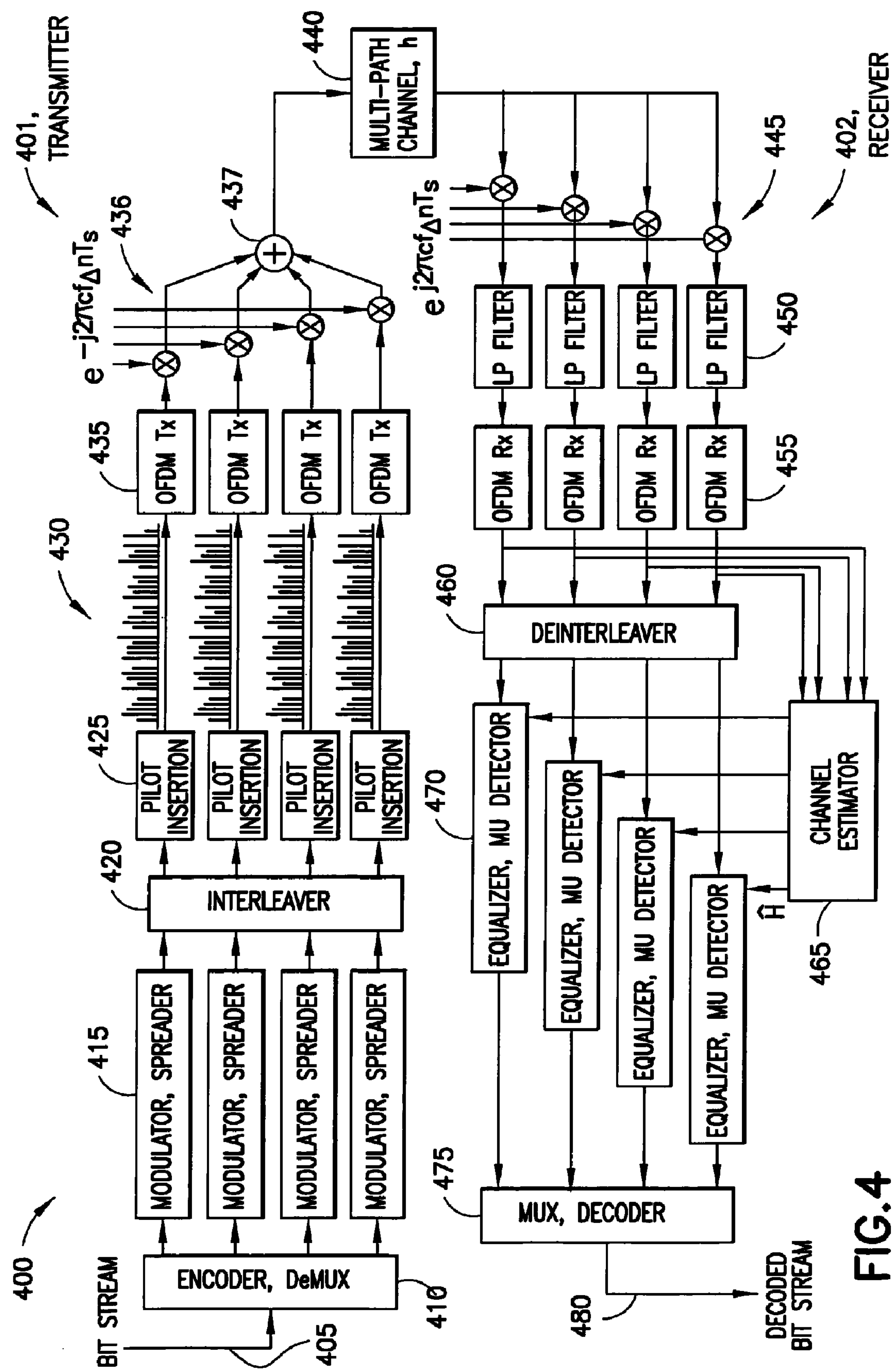
FIG. 4 is a high level block diagram of an exemplary wideband MC-CDMA system.

Our wideband system model is based on the narrowband system model introduced in the previous section. The model is constructed by arranging four narrowband systems in parallel in frequency domain, and multiplexing the signals of the four streams by appropriate frequency shifts. The block diagram of the wideband system is given in FIG. 4. FIG. 4 shows a wideband MC-CDMA system 400 comprising a transmitter 401 communicating with a receiver 402 over a multipath channel 440. The transmitter accepts a bit stream 405 and comprises an encoder, demultiplexer (DeMUX) module 410, four (in this example) modulator, spreader modules 415, an interleaver 420, four pilot insertion modules 425, four frequency domain signals 430, four OFDM transmitter modules 435, four multipliers 436, and an adder 437. As we see in FIG. 4, the signals from the corresponding narrowband systems are multiplied (using multipliers 436) by exponential functions in time-domain to perform appropriate frequency shifts. In the example of FIG. 4, the ordered retransmission module 120 (not shown in FIG. 4) would typically be comprised in or communicate with module 410.

The receiver algorithms for this wideband system 400 are similar to the narrowband system and can be easily determined by one skilled in the art. The receiver 402 comprises four (in this example) multipliers 445, four low pass filters 450, four OFDM receiver modules 455, a deinterleaver 460, four channel estimators 465, four equalizer, MU detector modules 470, and a multiplexer (MUX), decoder module 475. The receiver 402 produces a decoded bit stream 480. The ordered retransmission module 170 (not shown in FIG. 4) would typically be comprised in or communicate with modules 470.

The actual parameters of the systems that we have considered are as follows:

| | |
|---|---|
| Number of carriers (C): | 4 (wideband system) or 1 (narrowband system) |
| Sampling rate: | 16 × 1228800 (wideband system) or 4 × 1228800 (narrowband system) |
| Bandwidth of each carrier: | 1.25 MHz |
| Frequency separation of the carriers (CS): | 1.25 MHz |
| Number of data subcarriers in each carrier: | 224 |
| Number of pilots: | 32 |
| Number of subcarriers in each carrier (SC): | 256 |
| Spreading factor (SF): | 4 (MC-CDMA) or 1 (Pure OFDM) |
| Number of users per block (UpB): | 4 (fully loaded MC-CDMA) or 1 (lightly loaded MC-CDMA or Pure OFDM) |
| Modulation type: | QPSK or 16 QAM |
| Pilot power: | 1 (same as data part) |
| Interleaver: | No interleaver (NOI) or interleaving across all carriers (OFI) |
| Cyclic prefix: | 16 × 20 samples (wideband system) or 4 × 20 samples (narrowband system) |
| Pulse shaping filter: | 1 × EV-DV filter on each carrier and both sides (2 PSF's) |
| Channel estimation: | LS (ML when all taps are estimated) |
| Channel cancellation: | ZF or LMMSE |
| Data detection: | MF |
| Channel coding and interleaving: | Same as 1 × EV-DV with slight modifications to accommodate four carriers |
| Decoding: | Max-Log-MAP with eight iterations |

Channel Quality and Equivalent Channel Notions

Before presenting the exemplary ARQ algorithms used in this disclosure, we define two exemplary notions of channel quality and equivalent channel quality which will be used in the combining techniques discussed hereafter. While each is a channel quality as that term is generically used, different terms are used in this description to differentiate the various specific implementations. In the ensuing claims, channel quality is used in its generic sense and is not by itself an indication that equivalent channel quality, as described below, is excluded. We use equation [18] to describe an exemplary system in frequency domain, but we drop the index k used for subcarrier, and reserve the index for the retransmissions. Therefore, we assume that the following two equations correspond to the original transmission and the first retransmission of the data symbol S, respectively:

$$Y_1=H_1S+N_1, \quad [23]$$

and $$Y_2=H_2S+N_2. \quad [24]$$

We also denote the variances of the noise terms $N_1$ and $N_2$ by $\sigma_1^2$ and $\sigma_2^2$, respectively.

We first consider the case of a pure OFDM system, for which we define the notion of channel quality, and then study the case of multicarrier CDMA systems and define the notion of equivalent channel quality.

Pure OFDM System and Channel Quality Parameter

Since in a non-limiting example, we will be using a binary code for forward error correction, it is beneficial to derive the optimal combining by considering the soft bit values and finding the combining algorithm that results in the optimal soft bit values for the combined system. If we denote the modulation signal set by M, and the subsets of the modulation signal set consisting of all signal points with their k th bit being equal to zero and one by $M_k(0)$ and $M_k(1)$, respectively, we can write the a posteriori probabilities of the k th bit of the transmitted symbol as $$p(b_k=1\mid Y_1)=\sum_{S\in M_k(1)}p(S\mid Y_1)=\sum_{S\in M_k(1)}\frac{p(Y_1\mid S)p(S)}{p(Y_1)}=\sum_{S\in M_k(1)}\frac{1}{\pi\sigma_1^2}\exp\left\{-\frac{|Y_1-H_1S|^2}{\sigma_1^2}\right\}\frac{p(S)}{p(Y_1)},\quad [25]$$

and $$p(b_k=0\mid Y_1)=\sum_{S\in M_k(0)}p(S\mid Y_1)=\sum_{S\in M_k(0)}\frac{p(Y_1\mid S)p(S)}{p(Y_1)}=\sum_{S\in M_k(0)}\frac{1}{\pi\sigma_1^2}\exp\left\{-\frac{|Y_1-H_1S|^2}{\sigma_1^2}\right\}\frac{p(S)}{p(Y_1)}\quad [26]$$

for the original transmission. The above expressions are used in the Log-MAP algorithm to find the soft bit values, as given by the following expression:

$$\Lambda_k=\ln\left[\frac{p(b_k=1\mid Y_1)}{p(b_k=0\mid Y_1)}\right]=\ln\left[\frac{\sum_{S\in M_k(1)}\exp\left\{-\frac{|Y_1-H_1S|^2}{\sigma_1^2}\right\}}{\sum_{S\in M_k(0)}\exp\left\{-\frac{|Y_1-H_1S|^2}{\sigma_1^2}\right\}}\right]=\ln\left[\sum_{S\in M_k(1)}\exp\left\{-\frac{|Y_1-H_1S|^2}{\sigma_1^2}\right\}\right]-\ln\left[\sum_{S\in M_k(0)}\exp\left\{-\frac{|Y_1-H_1S|^2}{\sigma_1^2}\right\}\right]\quad [27]$$

where we have assumed that all constellation symbols are transmitted with equal probability (i.e., no shaping).

In this disclosure, we will use as an example the Max-Log-MAP decoder, which uses the following approximation for the above equation:

$$\Lambda_k\approx\max_{S\in M_k(1)}\left\{-\frac{|Y_1-H_1S|^2}{\sigma_1^2}\right\}-\max_{S\in M_k(0)}\left\{-\frac{|Y_1-H_1S|^2}{\sigma_1^2}\right\}.\quad [28]$$

If an error is detected at the receiver, a retransmission will be requested. Assuming that S is one of the retransmitted data symbols as in equation [24], the receiver has to use both $Y_1$ and $Y_2$ to find the a posteriori probabilities of the k th bit of S, as given in the following equations:

$$p(b_k=1\mid Y_1,Y_2)=\sum_{S\in M_k(1)}p(S\mid Y_1,Y_2)=\sum_{S\in M_k(1)}\frac{1}{\pi^2\sigma_1^2\sigma_2^2}\exp\left\{-\frac{|Y_1-H_1S|^2}{\sigma_1^2}-\frac{|Y_2-H_2S|^2}{\sigma_2^2}\right\}\frac{p(S)}{p(Y_1,Y_2)},\quad [29]$$

and $$p(b_k=0\mid Y_1,Y_2)=\sum_{S\in M_k(0)}p(S\mid Y_1,Y_2)=\sum_{S\in M_k(0)}\frac{1}{\pi^2\sigma_1^2\sigma_2^2}\exp\left\{-\frac{|Y_1-H_1S|^2}{\sigma_1^2}-\frac{|Y_2-H_2S|^2}{\sigma_2^2}\right\}\frac{p(S)}{p(Y_1,Y_2)}.\quad [30]$$

From these equations, the soft value for the k th bit at the output of the demodulator will be $$\tilde{\Lambda}_k=\ln\left[\frac{p(b_k=1\mid Y_1,Y_2)}{p(b_k=0\mid Y_1,Y_2)}\right]=\ln\left[\frac{\sum_{S\in M_k(1)}\exp\left\{-\frac{|Y_1-H_1S|^2}{\sigma_1^2}-\frac{|Y_2-H_2S|^2}{\sigma_2^2}\right\}}{\sum_{S\in M_k(0)}\exp\left\{-\frac{|Y_1-H_1S|^2}{\sigma_1^2}-\frac{|Y_2-H_2S|^2}{\sigma_2^2}\right\}}\right]=\ln\left[\sum_{S\in M_k(1)}\exp\left\{-\frac{|Y_1-H_1S|^2}{\sigma_1^2}-\frac{|Y_2-H_2S|^2}{\sigma_2^2}\right\}\right]-\ln\left[\sum_{S\in M_k(0)}\exp\left\{-\frac{|Y_1-H_1S|^2}{\sigma_1^2}-\frac{|Y_2-H_2S|^2}{\sigma_2^2}\right\}\right],\quad [31]$$

and the corresponding expression for the Max-Log-MAP algorithm will be given by the following expression:

$$\tilde{\Lambda}_k\approx\max_{S\in M_k(1)}\left\{-\frac{|Y_1-H_1S|^2}{\sigma_1^2}-\frac{|Y_2-H_2S|^2}{\sigma_2^2}\right\}-\max_{S\in M_k(0)}\left\{-\frac{|Y_1-H_1S|^2}{\sigma_1^2}-\frac{|Y_2-H_2S|^2}{\sigma_2^2}\right\}.\quad [32]$$

Comparing the above expression with equation [28], we see that the combining algorithm needs to find an equivalent expression for $$A=\frac{|Y_1-H_1S|^2}{\sigma_1^2}+\frac{|Y_2-H_2S|^2}{\sigma_2^2}.\quad [33]$$

Now, define the channel quality parameters $\rho_1$ and $\rho_2$ as $$\rho_1 = \frac{|H_1|^2}{\sigma_1^2} \text{ and } \rho_2 = \frac{|H_2|^2}{\sigma_2^2}. \quad [34]$$

Also define the normalized received signals $\tilde{Y}_1$ and $\tilde{Y}_2$ as $$\tilde{Y}_1 = \frac{Y_1}{H_1} \text{ and } \tilde{Y}_2 = \frac{Y_2}{H_2}. \quad [35]$$

Then we will have $$\begin{aligned} A &= \rho_1|\tilde{Y}_1 - S|^2 + \rho_2|\tilde{Y}_2 - S|^2 \\ &= \rho_1|\tilde{Y}_1|^2 + \rho_2|\tilde{Y}_2|^2 - 2\mathcal{R}\{S^*(\rho_1 Y_1 + \rho_2 Y_2)\} + (\rho_1 + \rho_2)|S|^2 \\ &= (\rho_1 + \rho_2)\left|\frac{\rho_1 Y_1 + \rho_2 Y_2}{\rho_1 + \rho_2} - S\right|^2 + \rho_1|\tilde{Y}_1|^2 + \rho_2|\tilde{Y}_2|^2 - \\ &\quad \frac{|\rho_1 Y_1 + \rho_2 Y_2|^2}{\rho_1 + \rho_2} \\ &= \tilde{\rho}|\tilde{Y} - S|^2 + C \text{ where} \end{aligned} \quad [36]$$

$$\tilde{\rho} = \rho_1 + \rho_2, \quad [37]$$

$$\tilde{Y} = \frac{\rho_1 Y_1 + \rho_2 Y_2}{\rho_1 + \rho_2}, \quad [38]$$

and C is a constant that does not depend on the choice of S in the maximizations in equation [32], and cancels out by the subtraction therein. With these definitions, the combining technique can be described as follows: For each individual transmission, define the channel quality and the normalized received signal according to equations [34] and [35], and obtain the soft bit values from $$\Lambda_k \approx \min_{S \in M_k(0)} \{\rho_1|\tilde{Y}_1 - S|^2\} - \min_{S \in M_k(1)} \{\rho_1|\tilde{Y}_1 - S|^2\}. \quad [39]$$

If a data symbol S is retransmitted, then combine the channel quality parameters and the normalized received signals of the two transmissions according to equations [37] and [38], and obtain the soft bit values from $$\tilde{\Lambda}_k \approx \min_{S \in M_k(0)} \{\tilde{\rho}|\tilde{Y} - S|^2\} - \min_{S \in M_k(1)} \{\tilde{\rho}|\tilde{Y} - S|^2\}. \quad [40]$$

Notice that this combining is the same as the Maximal Ratio Combining (MRC) when noise variances are equal. Also notice that the above combining can be used sequentially for more than two transmissions of the same signal as well. For example, if $$Y_3 = H_3 S + N_3 \quad [41]$$

corresponds to a second retransmission of the symbol S, and if we define $\rho_3$ and $\tilde{Y}_3$ similar to equations [34] and [35], then the receiver can use the same combining technique as above, to combine $\tilde{\rho}$ and $\tilde{Y}$ with $\rho_3$ and $\tilde{Y}_3$, and obtain $$\tilde{\tilde{\rho}} = \tilde{\rho} + \rho_3 = \rho_1 + \rho_2 + \rho_3, \quad [42]$$

$$\begin{aligned} \tilde{\tilde{Y}} &= \frac{\tilde{\rho}\tilde{Y} + \rho_3 Y_3}{\tilde{\rho} + \rho_3} \\ &= \frac{(\rho_1 + \rho_2)\frac{\rho_1 Y_1 + \rho_2 Y_2}{\rho_1 + \rho_2} + \rho_3 Y_3}{\rho_1 + \rho_2 + \rho_3} \\ &= \frac{\rho_1 Y_1 + \rho_2 Y_2 + \rho_3 Y_3}{\rho_1 + \rho_2 + \rho_3}. \end{aligned} \quad [43]$$

Multicarrier CDMA System and Equivalent Channel Quality Parameter

Now assume that we have a multicarrier CDMA system, in which each data symbol is spread using a Walsh-Hadamard code of length $N_c$. Also assume that in each section J spread streams are generated and combined to generate a single multi-coded spread stream of length $N_c$ (see FIG. 2). With these assumptions, the following equations will describe the signals at the output of a given section corresponding to the original transmission of that section:

$$Y_{1i} = H_{1i} \sum_{j=0}^{J-1} c_{ij} S_j + N_{1i},\ i = 1, \ldots, N_c. \quad [44]$$

Therefore, we will have the following expressions for the a posteriori probabilities of the k th bit of the j th data symbol in this section:

$$\begin{aligned} p(b_{jk} = 1 \mid Y_{11}, \ldots, Y_{1N_c}) &= \sum_{\substack{S_j \in M_k(1) \\ S_l \in M \text{ for } l \neq j}} p(S_0, \ldots, S_{J-1} \mid Y_{1l}, \ldots, Y_{1N_c}) \\ &= \sum_{\substack{S_j \in M_k(1) \\ S_l \in M \text{ for } l \neq j}} \frac{p(S_0, \ldots, S_{J-1})}{p(Y_{1l}, \ldots, Y_{1N_c})} \prod_{i=1}^{N_c} \frac{1}{\pi\sigma_{1i}^2} \exp\left\{-\frac{\left|Y_{1i} - H_{1i}\sum_{l=0}^{J-1} c_{il} S_l\right|^2}{\sigma_{1i}^2}\right\}, \end{aligned} \quad [45]$$

$$\begin{aligned} p(b_{jk} = 0 \mid Y_{11}, \ldots, Y_{1N_c}) &= \sum_{\substack{S_j \in M_k(0) \\ S_l \in M \text{ for } l \neq j}} p(S_0, \ldots, S_{J-1} \mid Y_{1l}, \ldots, Y_{1N_c}) \\ &= \sum_{\substack{S_j \in M_k(0) \\ S_l \in M \text{ for } l \neq j}} \frac{p(S_0, \ldots, S_{J-1})}{p(Y_{1l}, \ldots, Y_{1N_c})} \prod_{i=1}^{N_c} \frac{1}{\pi\sigma_{1i}^2} \exp\left\{-\frac{\left|Y_{1i} - H_{1i}\sum_{l=0}^{J-1} c_{il} S_l\right|^2}{\sigma_{1i}^2}\right\}, \end{aligned} \quad [46]$$

Similar to the case of pure OFDM signaling, we can use the above expressions to obtain the soft bit values for Log-MAP decoding as:

$$\Lambda_{jk} = \ln\left[\frac{p(b_{jk}=1 \mid Y_{11}, \ldots, Y_{1N_c})}{p(b_{jk}=0 \mid Y_{11}, \ldots, Y_{1N_c})}\right] \quad [47]$$

$$= \ln\left[\frac{\sum_{\substack{S_j\in M_k(1)\\ S_l\in M \text{ for } l\neq j}} \prod_{i=1}^{N_c} \exp\left\{-\frac{\left|Y_{1i}-H_{1i}\sum_{l=0}^{J-1}c_{il}S_l\right|^2}{\sigma_{1i}^2}\right\}}{\sum_{\substack{S_j\in M_k(0)\\ S_l\in M \text{ for } l\neq j}} \prod_{i=1}^{N_c} \exp\left\{-\frac{\left|Y_{1i}-H_{1i}\sum_{l=0}^{J-1}c_{il}S_l\right|^2}{\sigma_{1i}^2}\right\}}\right],$$

$$= \ln\left[\sum_{\substack{S_j\in M_k(1)\\ S_l\in M \text{ for } l\neq j}} \exp\left\{-\sum_{i=1}^{N_c}\frac{\left|Y_{1i}-H_{1i}\sum_{l=0}^{J-1}c_{il}S_l\right|^2}{\sigma_{1i}^2}\right\}\right] - \ln\left[\sum_{\substack{S_j\in M_k(0)\\ S_l\in M \text{ for } l\neq j}} \exp\left\{-\sum_{i=1}^{N_c}\frac{\left|Y_{1i}-H_{1i}\sum_{l=0}^{J-1}c_{il}S_l\right|^2}{\sigma_{1i}^2}\right\}\right]$$

and for Max-Log-MAP decoding as:

$$\Lambda_{jk} \approx \max_{\substack{S_j\in M_k(1)\\ S_l\in M \text{ for } l\neq j}}\left\{-\sum_{i=1}^{N_c}\frac{\left|Y_{1i}-H_{1i}\sum_{l=0}^{J-1}c_{il}S_l\right|^2}{\sigma_{1i}^2}\right\} - \max_{\substack{S_j\in M_k(0)\\ S_l\in M \text{ for } l\neq j}}\left\{-\sum_{i=1}^{N_c}\frac{\left|Y_{1i}-H_{1i}\sum_{l=0}^{J-1}c_{il}S_l\right|^2}{\sigma_{1i}^2}\right\}. \quad [48]$$

Defining the channel quality parameters (equation [49]) and the normalized received signals (equation [50]) as $$\rho_{1i} = \frac{|H_{1i}|^2}{\sigma_{1i}^2}, \quad [49]$$

and $$\tilde{Y}_{1i} = \frac{Y_{1i}}{H_{1i}}, \quad [50]$$

we can write $$\Lambda_{jk} \approx \min_{\substack{S_j\in M_k(0)\\ S_l\in M \text{ for } l\neq j}}\left\{\sum_{i=1}^{N_c}\rho_{1i}\left|\tilde{Y}_{1i}-\sum_{l=0}^{J-1}c_{il}S_l\right|^2\right\} - \min_{\substack{S_j\in M_k(1)\\ S_l\in M \text{ for } l\neq j}}\left\{\sum_{i=1}^{N_c}\rho_{1i}\left|\tilde{Y}_{1i}-\sum_{l=0}^{J-1}c_{il}S_l\right|^2\right\}. \quad [51]$$

If a retransmission of the current block is in order, and if this retransmission is described by the following equation, $$Y_{2i} = H_{2i}\sum_{j=0}^{J-1}c_{ij}S_j + N_{2i},\ i = 1, \ldots, N_c, \quad [52]$$

then the a posteriori probabilities of the k th bit of the j th symbols will be given by $$p(b_{jk}=1 \mid Y_{11}, \ldots, Y_{1N_c}, Y_{21}, \ldots, Y_{2N_c}) = \sum_{\substack{S_j\in M_k(1)\\ S_l\in M \text{ for } l\neq j}} p(S_0, \ldots, S_{J-1} \mid Y_{11}, \ldots, Y_{1N_c}, Y_{21}, \ldots, Y_{2N_c}) \quad [5\text{:}$$

$$= \sum_{\substack{S_j\in M_k(1)\\ S_l\in M \text{ for } l\neq j}} \frac{p(S_0, \ldots, S_{J-1})}{p(Y_{11}, \ldots, Y_{1N_c}, Y_{21}, \ldots, Y_{2N_c})} \times \prod_{i=1}^{N_c}\frac{1}{\pi^2\sigma_{1i}^2\sigma_{2i}^2}\exp\left\{-\frac{\left|Y_{1i}-H_{1i}\sum_{l=0}^{J-1}c_{il}S_l\right|^2}{\sigma_{1i}^2}\right\} \exp\left\{-\frac{\left|Y_{2i}-H_{2i}\sum_{l=0}^{J-1}c_{il}S_l\right|^2}{\sigma_{2i}^2}\right\},$$

and

-continued $$p\left(b_{jk}=0 \mid Y_{11},\ldots,Y_{1N_c},Y_{21},\ldots,Y_{2N_c}\right)=\sum_{\substack{S_j\in M_k(0)\\ S_l\in M \text{ for } l\neq j}} p(S_0,\ldots,S_{J-1}\mid Y_{11},\ldots,Y_{1N_c},Y_{21},\ldots,Y_{2N_c}) \quad [54]$$

$$=\sum_{\substack{S_j\in M_k(0)\\ S_l\in M \text{ for } l\neq j}} \frac{p(S_0,\ldots,S_{J-1})}{p\left(Y_{11},\ldots,Y_{1N_c},Y_{21},\ldots,Y_{2N_c}\right)}\times \prod_{i=1}^{N_c}\frac{1}{\pi^2\sigma_{1i}^2\sigma_{2i}^2}\exp\left\{-\frac{\left|Y_{1i}-H_{1i}\sum_{l=0}^{J-1}c_{il}S_l\right|^2}{\sigma_{1i}^2}\right\} \exp\left\{-\frac{\left|Y_{2i}-H_{2i}\sum_{l=0}^{J-1}c_{il}S_l\right|^2}{\sigma_{2i}^2}\right\}.$$

From these equations, one can derive the expressions for the soft bit values for Max-Log-MAP decoder as $$\Lambda_{jk}\approx \min_{\substack{S_j\in M_k(0)\\ S_l\in M \text{ for } l\neq j}} \left\{\sum_{i=1}^{N_c}\rho_{1i}\left|\tilde{Y}_{1i}-\sum_{l=0}^{J-1}c_{il}S_l\right|^2+\sum_{i=1}^{N_c}\rho_{2i}\left|\tilde{Y}_{2i}-\sum_{l=0}^{J-1}c_{il}S_l\right|^2\right\}- \min_{\substack{S_j\in M_k(1)\\ S_l\in M \text{ for } l\neq j}} \left\{\sum_{i=1}^{N_c}\rho_{1i}\left|\tilde{Y}_{1i}-\sum_{l=0}^{J-1}c_{il}S_l\right|^2+\sum_{i=1}^{N_c}\rho_{2i}\left|\tilde{Y}_{2i}-\sum_{l=0}^{J-1}c_{il}S_l\right|^2\right\}, \quad [55]$$

$$=\min_{\substack{S_j\in M_k(0)\\ S_l\in M \text{ for } l\neq j}} \left\{\sum_{i=1}^{N_c}\tilde{\rho}_i\left|\tilde{Y}_i-\sum_{l=0}^{J-1}c_{il}S_l\right|^2\right\}- \min_{\substack{S_j\in M_k(1)\\ S_l\in M \text{ for } l\neq j}} \left\{\sum_{i=1}^{N_c}\tilde{\rho}_i\left|\tilde{Y}_i-\sum_{l=0}^{J-1}c_{il}S_l\right|^2\right\}$$

where $\rho_{2i}$, $\tilde{Y}_{2i}$, $\tilde{\rho}_i$, and $\tilde{Y}_i$ are defined as $$\rho_{2i}=\frac{|H_{2i}|^2}{\sigma_{2i}^2}, \quad [56]$$

$$\tilde{Y}_{2i}=\frac{Y_{2i}}{H_{2i}}, \quad [57]$$

$$\tilde{\rho}_i=\rho_{1i}+\rho_{2i}, \quad [58]$$

$$\tilde{Y}_i=\frac{\rho_{1i}Y_{1i}+\rho_{2i}Y_{2i}}{\rho_{1i}+\rho_{2i}}. \quad [59]$$

As we see, the combining method is the same as in pure OFDM, performed separately on each chip. We still need to find a single channel quality parameter for each symbol, to be able to sort the data symbols in terms of their channel quality parameters in the ordered retransmission scheme described in the section entitled Ordered Retransmissions with Maximal Ratio Combining, and choose a number of data symbols with the worst channel quality to retransmit. For this, we consider the zero-forcing (ZF) channel cancellation with matched filter (MF) detector. The output of the ZF equalizer for the original transmission will be $$\tilde{Y}_{1i}=\sum_{j=0}^{J-1}c_{ij}S_j+\tilde{N}_{1i},\ i=1,\ldots,N_c, \quad [60]$$

where $$\tilde{N}_{1i}=\frac{N_{1i}}{H_{1i}}$$

is an additive white Gaussian noise term with variance $$E\{|\tilde{N}_{1i}|^2\}=E\left\{\frac{|N_{1i}|^2}{|H_{1i}|^2}\right\}=\frac{\sigma_{1i}^2}{|H_{1i}|^2}=\frac{1}{\rho_{1i}}. \quad [61]$$

And at the output of the j th matched filter, we will have $$\tilde{\tilde{Y}}_{1j}=\sum_{i=1}^{N_c}c_{ij}^*\tilde{Y}_{1i} \quad [62]$$

$$=\sum_{i=1}^{N_c}c_{ij}^*\left(\sum_{l=0}^{J-1}c_{il}S_l+\tilde{N}_{1i}\right)$$

$$=\sum_{l=0}^{J-1}S_l\sum_{i=1}^{N_c}c_{ij}^*c_{il}+\sum_{i=1}^{N_c}c_{ij}^*\tilde{N}_{1i}$$

$$=\sum_{l=0}^{J-1}S_l\delta_{jl}+\tilde{\tilde{N}}_{1j}=S_j+\tilde{\tilde{N}}_{1j}$$

where the variance of the additive noise term is $$E\left\{|\tilde{N}_{1i}|^2\right\} = E\left\{\left|\sum_{i=1}^{N_c} c_{ij}^* \tilde{N}_{1i}\right|^2\right\} = \sum_{i=1}^{N_c} |c_{ij}^*|^2 E\left\{|\tilde{N}_{1i}|^2\right\} = \frac{1}{N_c}\sum_{i=1}^{N_c}\frac{1}{\rho_{1i}}. \quad [63]$$

Therefore, the equivalent channel quality parameter, $\tilde{\rho}_{1j}$, will be given by $$\tilde{\rho}_{1j} = \left(\frac{1}{N_c}\sum_{i=1}^{N_c}\frac{1}{\rho_{1i}}\right)^{-1}. \quad [64]$$

As we see, for a matched filter receiver, the equivalent channel quality parameter is the harmonic mean of the channel quality parameters of the individual chips.

ARQ Algorithms

In this section, we study different ARQ algorithms for the multicarrier systems. We consider standard ARQ algorithms, with and without channel state information at the transmitter. We assume that, even though the original frame (e.g., frame 140 of FIG. 1) may consist of several OFDM symbols (e.g., data block 241), at each retransmission only one OFDM symbol is transmitted. It can be shown that this results in increased throughput, at the expense of increased receiver complexity. In practice, the transmitter can combine OFDM symbols from different frames to form a single frame to retransmit.

We assume in a non-limiting example that there is no forward error correction coding, and the transmission reliability is guaranteed only through the automatic repeat request algorithm (standard ARQ). As a result, we cannot use incremental redundancy algorithms. We can, however, use combining techniques such as maximal ratio combining as described in the section entitled Channel Quality and Equivalent Channel Notions. Depending on the amount of available channel state information, the transmitter can use different algorithms to decide which blocks to retransmit once a negative acknowledgement is received. In this disclosure, we consider two extreme cases of no channel state information at the transmitter, and complete channel state information at the transmitter. In each case, we use the maximal ratio combining of the previous section at the receiver to combine the original frame and retransmissions of its OFDM symbols.

Sequential Retransmissions with Maximal Ratio Combining

If no channel state information is available at the transmitter and a retransmission is in order, the transmitter can arbitrarily choose one OFDM symbol of the original frame and transmit the OFDM symbol. The receiver combines this OFDM symbol with its previously received copy using the maximal ratio combining of the previous section, and then reexamines the whole frame for possible detectable errors. If the frame is still in error, another retransmission request is generated, and the transmitter retransmits another OFDM symbol from the original frame. For simplicity, we assume that the transmitter performs the retransmissions sequentially, starting from the first OFDM symbol of the frame and transmitting a subsequent OFDM symbol for each retransmission. If, after retransmitting the last block, still another retransmission is in order, the process is repeated starting from the first block. As explained in the section entitled Pure OFDM System and Channel Quality Parameter, the combining can be performed with arbitrary number of retransmissions of the same signal.

Figure 5:
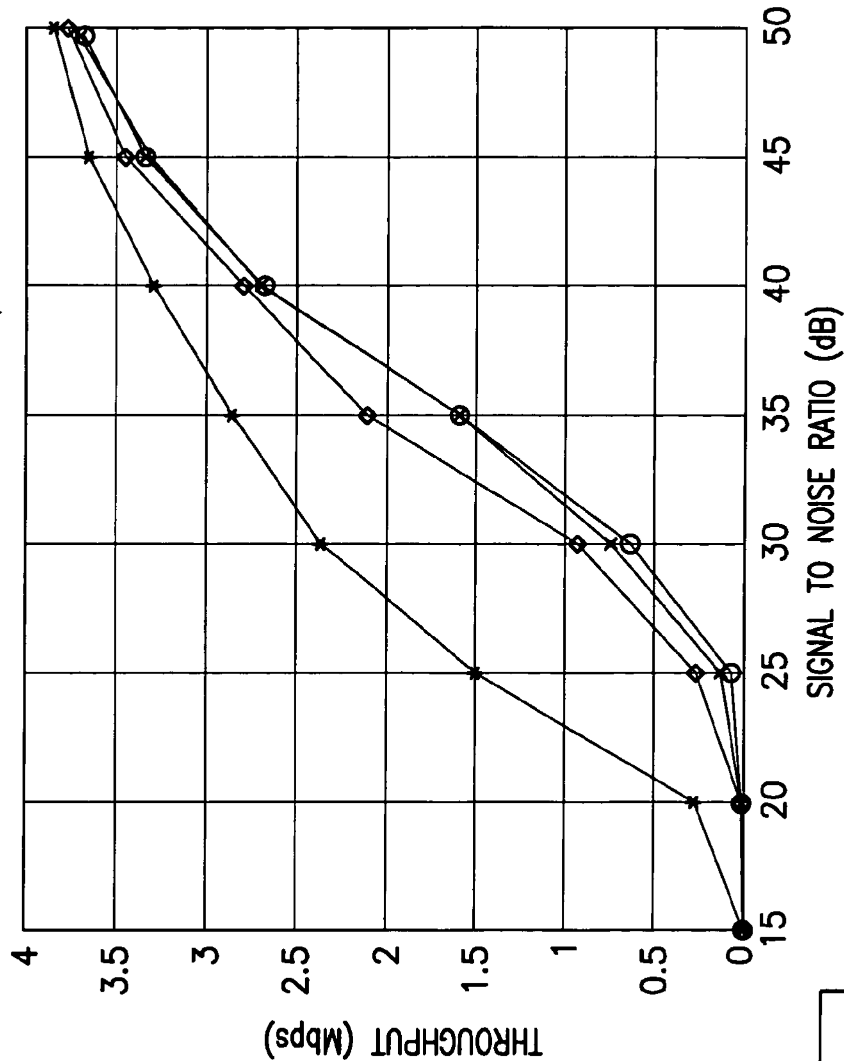
FIG. 5 is a graph comparing achievable throughputs by a narrowband OFDM system with sequential standard ARQ and different values of maximum retransmissions in block Vehicular A channel.

FIG. 5 compares the achievable throughputs by a narrowband OFDM system with sequential standard ARQ. Different curves correspond to different values of maximum number of retransmissions. The channel is assumed to be a block fading channel with the delay and power profile of the ITU Vehicular A channel. As we see, a significant gain can be achieved when a maximum of six retransmissions is used. Since, in this case, each frame consists of six OFDM symbols, this corresponds to one retransmission of the whole frame. Also we notice that the gain achieved by retransmission of a smaller number (e.g., one and three) of OFDM symbols is not as significant. This is an expected result, because data symbol and bit errors can occur at any part of the original frame, and retransmission of OFDM symbols in a sequential order will not correct the errors occurred in the last OFDM symbols of the frame, unless the whole frame is retransmitted. As we will see in the next section, when ordered retransmissions are used the results are quite different, and one can get significant gains by retransmitting only one OFDM symbol of the frame.

We also observe that, in FIG. 5, as SNR increases, all four curves converge and the achievable throughput by each scheme approaches the theoretical maximum of 3.989 Mbps imposed by the constellation size and symbol interval. This means that at high SNR the majority of frames are received correctly at the original transmission, and the probability of retransmission becomes very small.

Figure 6:
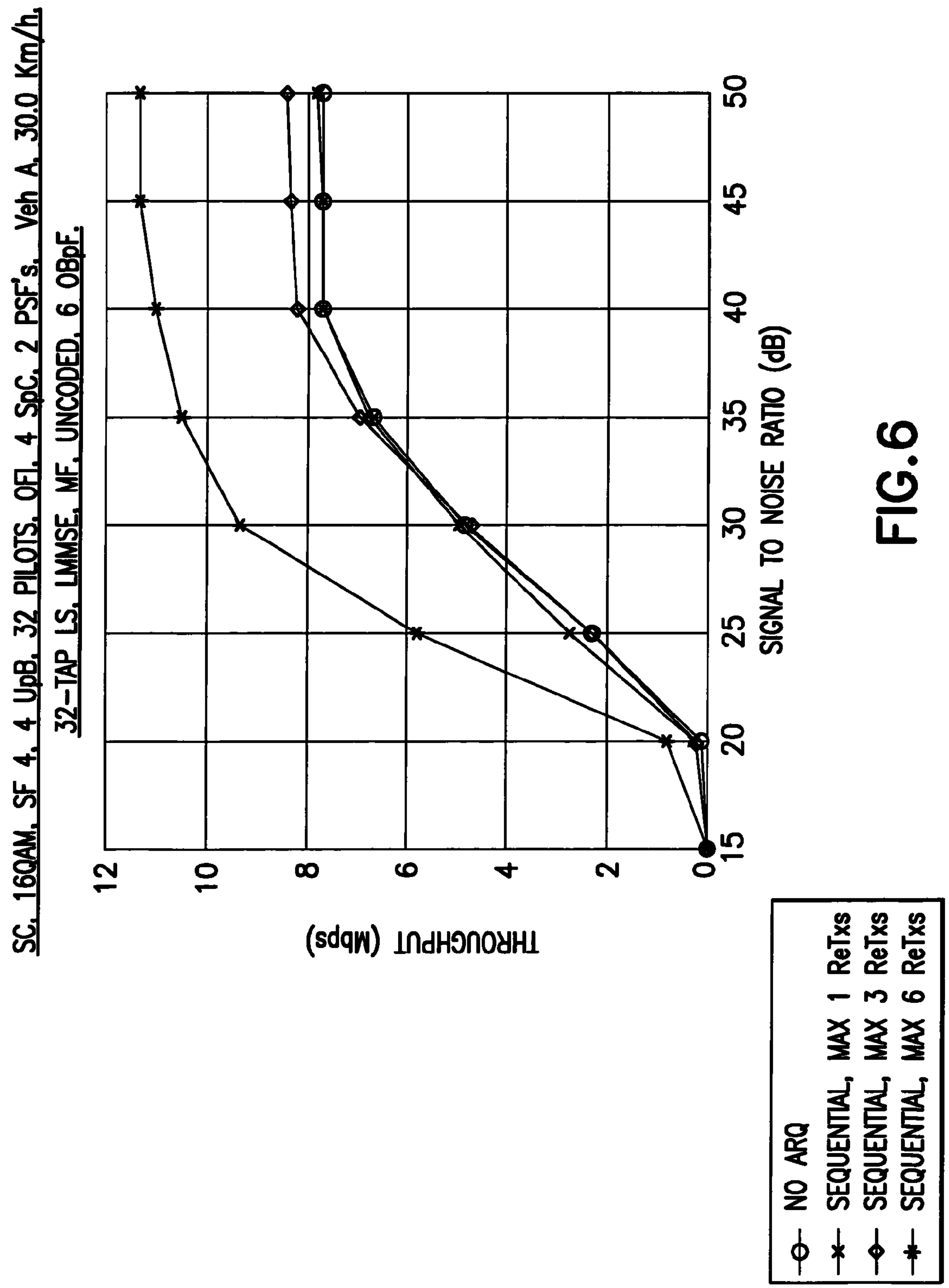
FIG. 6 is a graph comparing achievable throughputs by a wideband MC-CDMA system with sequential standard ARQ and different values of maximum retransmissions in ITU Vehicular A channel at 30 Km/h.

FIG. 6 shows similar results for a wideband MC-CDMA system in the ITU Vehicular A channel at 30 Km/h. The saturation regions in the throughput curves in this case (which are at a smaller throughput than the theoretical maximum), are due to two effects. The first degrading effect is due to the residual channel taps. The ITU Vehicular A channel, when sampled at the sampling rate of this system (16×1228800 samples per second) has a maximum of 51 taps. However, the system uses only 32 pilots in each OFDM symbol and hence, can estimate at most 32 taps of the channel. The remaining taps contribute to the estimation error and result in error floors or saturation regions in the throughput curves. The second degrading effect is due to the Doppler spread that results in inter channel interference and thus error floors even in the absence of multipath. As we see in this figure, the ARQ technique can significantly reduce the errors due to these two effects and provide a substantial increase in the maximum achievable throughput.

Figure 7:
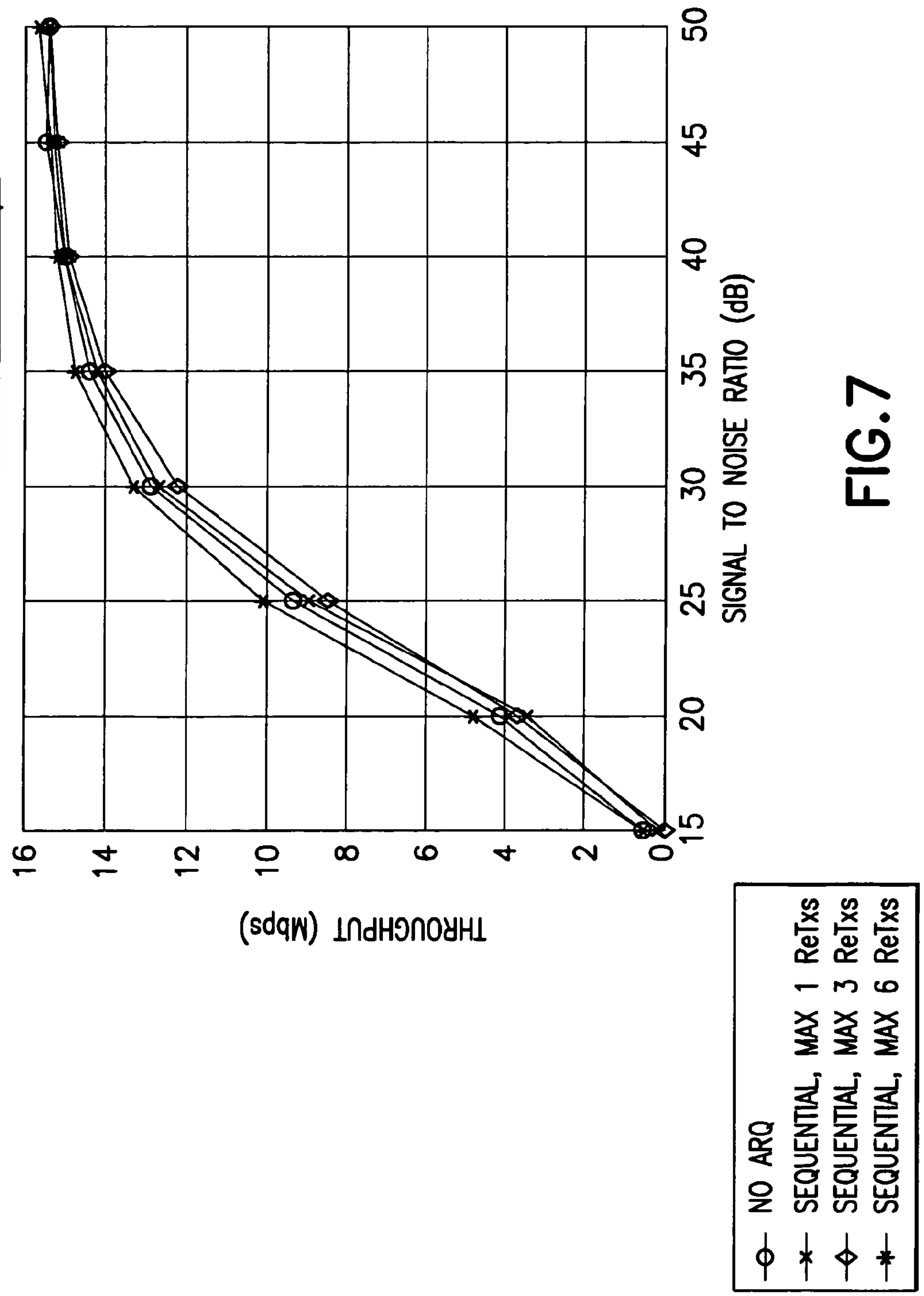
FIG. 7 is a graph comparing achievable throughputs by a wideband MC-CDMA system with sequential standard ARQ and different values of maximum retransmissions in ITU Pedestrian A channel at 3 Km/h.

FIG. 7 compares the achievable throughputs by a wideband MC-CDMA system in the ITU Pedestrian A channel at 3 Km/h. As in the previous two cases, different curves correspond to different values for maximum number of retransmissions. These curves show a very interesting result. When the maximum number of retransmissions is one or three OFDM symbols, the throughput actually decreases as compared to the case with no ARQ. However, with a maximum of six retransmissions (i.e., the whole frame), the throughput slightly increases. The reason is two-fold. First, the Pedestrian A channel has a much smaller delay spread than the Vehicular A channel. As we see, a 3-tap estimator seems to be able to efficiently capture all of the multipath components. This means that the channel does not have a significant amount of frequency selectivity, and different data symbols (e.g., subcarriers, as each data symbol corresponds to a subcarrier in OFDM) of an OFDM symbol observe similar channel conditions. Second, the Pedestrian channel at 3 Km/h has a much lower Doppler spread than the Vehicular A channel at 30 Km/h. This means that the channel does not have a significant amount of time selectivity, and different OFDM symbols of the same frame observe similar channel conditions. Therefore, all OFDM symbols of each frame observe very similar channel conditions, and thus the OFDM symbol (and corresponding data symbol) error probabilities at different parts of each frame are almost equal. This means that, with high probability, if a frame is in error, then most of the OFDM symbols in the frame are in error. As a result, retransmission of only a part of the frame cannot correct all of the OFDM symbol and data symbol errors in the frame. Since each retransmission increases the actual frame duration by the duration of an OFDM symbol, the overall effect of theses partial retransmissions can be a decrease in the total throughput. The same reason also explains the smaller gain observed with a maximum of six retransmissions in pedestrian channel as compared to the case of vehicular channel. In the case of pedestrian channel, the majority of retransmitted frames actually use all of the six available retransmissions, whereas in the vehicular channel, some of the frame errors can be corrected by a smaller number of retransmissions. This results in a smaller retransmission overhead and hence a larger throughput gain in vehicular channel.

We also observe that, due to the smaller delay and Doppler spread in pedestrian channel, the channel estimation has a better performance in this case, and unlike the case of vehicular channel, the saturation regions of the throughput curves are, in fact, at the theoretical maximum of 15.957 Mbps imposed by the constellation size and symbol duration.

Ordered Retransmissions with Maximal Ratio Combining

In an exemplary embodiment, if channel state information is available at the transmitter and a retransmission is in order, the transmitter (e.g., or receiver) can use the channel estimates (e.g., channel state information) to choose the best data symbols to retransmit, i.e., instead of transmitting an arbitrary OFDM symbol of the frame, an OFDM symbol is transmitted consisting of those data symbols of the frame that suffered from the worst channel conditions during the original or previous transmissions. Note that the data symbols are determined by determining channel parameters for the one or more subchannels to which a data symbols corresponds. The transmitter sorts the previously transmitted data symbols in terms of their channel quality parameters (e.g., equivalent channel quality parameters) as defined in the sections entitled Pure OFDM System and Channel Quality Parameter and Multicarrier CDMA System and Equivalent Channel Quality Parameter, and then chooses a number of data symbols with the worst channel quality parameters to form one or more new OFDM symbols and retransmits those OFDM symbols. The receiver combines the data symbols in the retransmitted OFDM symbol(s) with the corresponding data symbols from the previously received frame using the maximal ratio combining of the previous section. Then the receiver reexamines the whole frame for possible detectable errors. If the frame is still in error, another retransmission request (Nack) is generated. Upon receiving the new retransmission request, the transmitter first combines the channel quality parameters of the previous transmissions by simply adding the quality parameters as described in the previous section. The transmitter then sorts the data symbols in terms of their updated equivalent channel quality parameters, and retransmits the ones with the worst channel quality. Since data symbol and bit errors are more likely to happen when channel quality is poor, this approach is optimal in the sense that it requires the least average number of retransmissions to correct a given number of data symbol or bit errors. As we will see, our numerical results confirm the superior performance of this approach compared to the method of the previous section.

Figure 8:
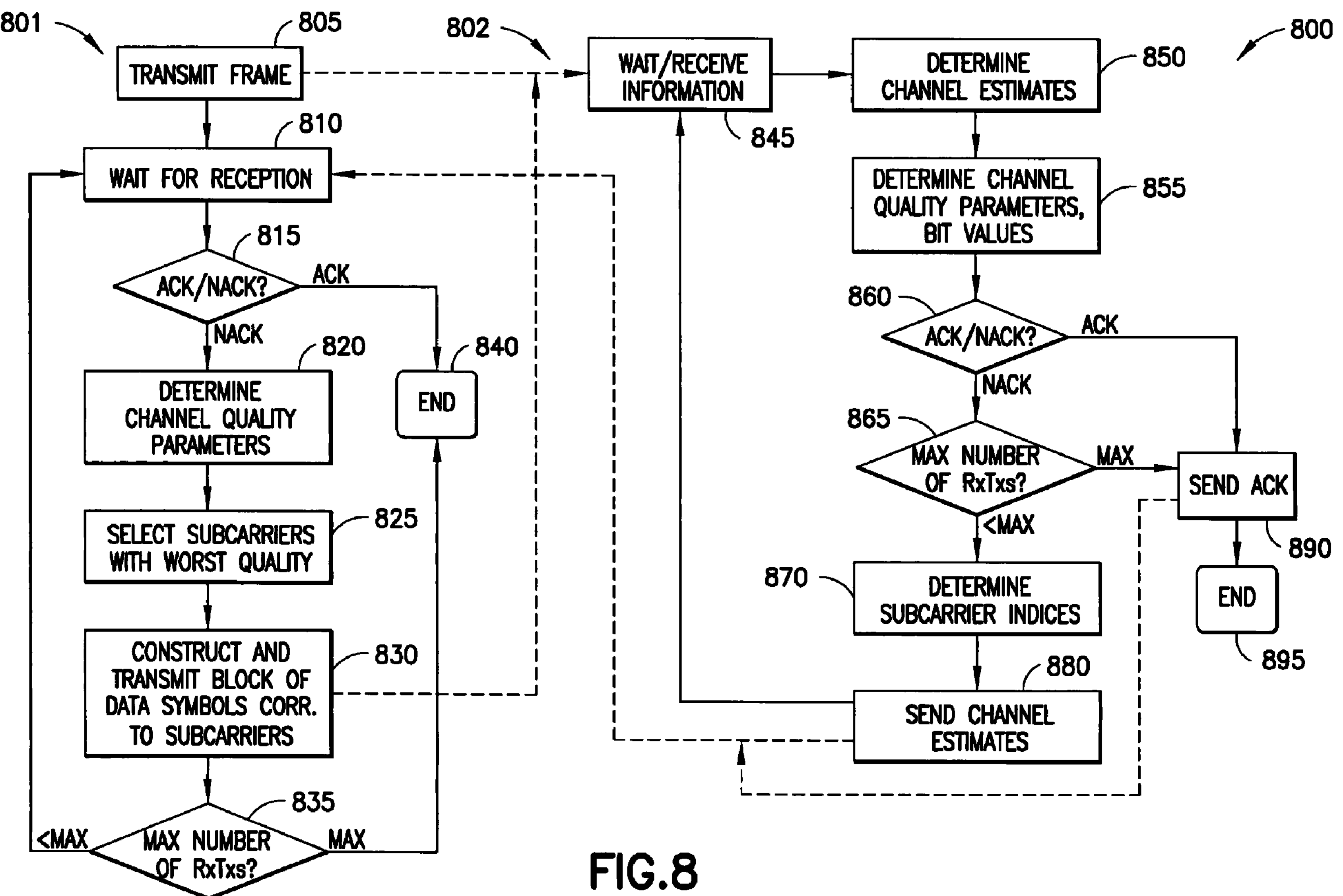
FIG. 8 is a flowchart of an exemplary method for ordered retransmissions for ARQ where a transmitter determines which data symbols should be retransmitted.

There are a number of techniques for performing ordered retransmissions, and two exemplary techniques are described here. Referring to FIG. 8, a flowchart is shown of an exemplary method 800 for ordered retransmissions for ARQ where a transmitter determines which data symbols should be retransmitted. For sake of clarity, in FIG. 8, it is assumed that a “transmitter” is a “base station” and a “receiver” is a mobile terminal. Method 800 is split into a method 801 performed by a base station and method 802 performed by a mobile terminal. Methods 801 and 802 are performed in parallel. Method 801 begins in step 805, when a base station transmits a frame (e.g., frame 140 of FIG. 1). It should be noted that a frame could include a single OFDM symbol, if desired, instead of multiple OFDM symbols. The base station waits for reception from the mobile terminal in step 810. When there is a reception, the base station determines whether the reception includes an Ack (acknowledge) or a Nack (no acknowledge) in step 815. If the reception includes an Ack (step 815=Ack), method 801 ends in step 840.

If the reception includes a Nack (step 815=Nack), it is assumed in this example that the reception further includes channel estimates (e.g., channel estimates 135 in FIG. 1), such as the estimate of the impulse response of the channel or other channel estimates, such as the frequency response of the channel. The frequency response of the channel though will need a lot more information to be sent than just the impulse response of the channel. Using the channel estimates, the base station determines the channel quality parameters for the subcarriers in step 820. In OFDM, a channel quality parameter will be determined for each subcarrier (see equation [34] for a single transmission of a data symbol or equation [42] for multiple transmissions). In MC-CDMA, a channel quality parameter (called an “equivalent” channel quality parameter, see equation [64] above) will be determined for a stream, J, of subcarriers. It should be noted that each time step 820 is performed, the channel quality parameters will typically be combined as described above. Additionally step 825 (and herein other steps discussing determining channel quality parameters for subcarrier and selecting subcarriers) determines channel quality parameters for transmissions over the subcarriers. In other words, in FIG. 1, a frame 140 has k transmissions (e.g., OFDM symbols 141) using N subcarriers 143. The same subcarrier is used for k transmissions in the frame 140. The channel quality parameters are therefore determined for each transmission over a subcarrier. It should also be noted the selection of data symbols instead of subcarriers could also be performed in step 825, as it is known which subcarriers are used to carry which symbols in the k transmissions of a frame 140.

In step 825, the base station selects the subcarriers with the worst quality as determined by an ordered list of values of channel quality parameters for the subcarriers. Note that in pure OFDM, the ordered list would be a list of values corresponding to subcarriers, while in MC-CDMA, the ordered list would be a list of values corresponding to streams of subcarriers. In other words, for MC-CDMA, if a first data symbol is communicated over subchannels one through four, there would be one value of channel quality parameter for subchannels one through four.

In step 830, the base station constructs a block (e.g., data block 142 of FIG. 1) of data symbols that correspond to the subcarriers with the worst channel quality parameters. Also in step 830, the base station retransmits the block. Generally a frame (e.g., frame 140 of FIG. 1) would be made and include one or more OFDM symbols containing the subchannels with the worst channel quality and new data in other OFDM symbols to make a complete frame. Typically, a block of data would be the exact size of an OFDM symbol, e.g., if an OFDM symbol can carry 256 data symbols, then the 256 data symbols with the worst channel quality parameters (as determined by channel quality parameters of associated subchannels) would be used in a data block 142. However, fewer (e.g., 200 data symbols when an OFDM symbol can carry 256 data symbols) or more (e.g., 300 data symbols when an OFDM symbol can carry 256 data symbols) data symbols with the worst channel quality parameters can be retransmitted. It should also be noted that as data symbols are associated with data (e.g., bits) from a bit stream, data in the form of bits could be stored and then used for retransmission, or modulated symbols created from the data could be stored and used for retransmission.

In step 835, it is determined if the maximum number of retransmissions have been performed. If so (step 835=Max), method 801 ends in step 840. If not (step 835=<Max), the method 801 continues in step 810. An ordered retransmission module 120 of FIG. 1 would typically perform steps 820, 825, 830, and 835 of method 801 (although actual retransmission would be performed by other parts of the base station).

Method 802 is performed by the mobile terminal and at the same as method 801 is performed. In step 845, the mobile terminal waits to receive information and then receives information. In step 850, the mobile terminal determines channel estimates. In step 855, the channel quality parameters are determined as described above. Bit values may also be determined. The channel quality parameters and bit values will be combined as described above for each retransmission. In step 860, the mobile terminal determines whether an Ack or a Nack should be communicated to the base station. If an Ack is to be transmitted (step 860=Ack), an Ack is sent in step 890 and the method 802 ends in step 895. If a Nack should be communicated to the mobile terminal (step 860=Nack), it is determined in step 865 if the maximum number of retransmissions has been reached. If so (step 865=Max), an Ack is sent in step 890 and the method 802 ends in step 895.

If not (step 865=<Max), the mobile terminal determines the subcarrier indices of the subcarriers with the worst quality for the channel quality parameters. The mobile terminal does this so that when the base station retransmits the data symbols, the mobile terminal will have determined which data symbols are being retransmitted. It should be noted that the base station and mobile terminal will have to both know the order in which the data symbols will be transmitted and retransmitted. Alternatively, indices could be transmitted along with the data symbols. In step 880, the mobile terminal sends the channel estimates (determined in step 850) to the base station. The method continues in step 845, as the mobile terminal waits for information from the base station. It should be noted that an ordered retransmission module 170 (see FIG. 1) would typically perform steps 855, 870, and 880 of method 802.

Figure 9:
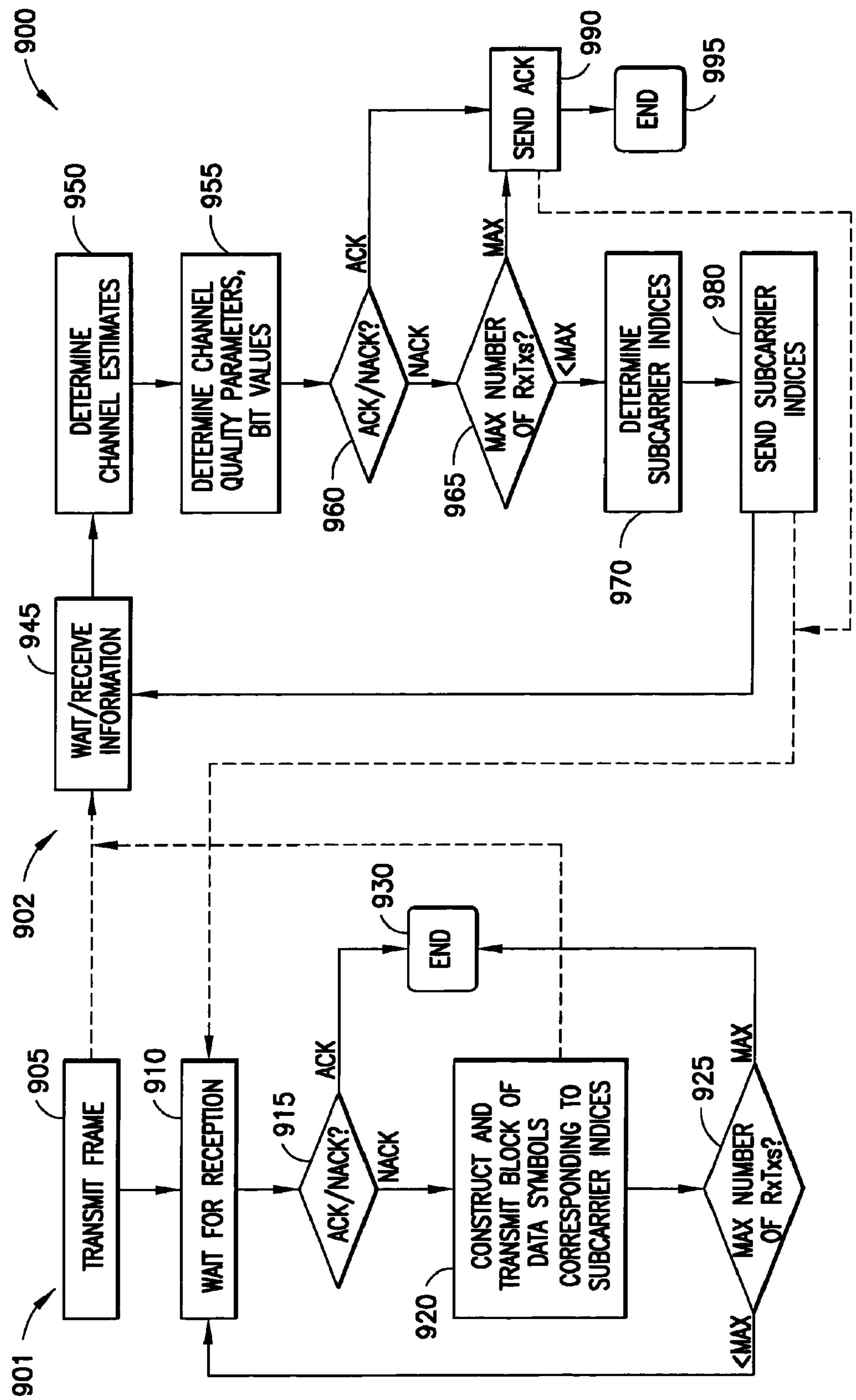
FIG. 9 is a flowchart of an exemplary method for ordered retransmissions for ARQ where a receiver determines which data symbols should be retransmitted.

Referring to FIG. 9, a flowchart is shown of an exemplary method 900 for ordered retransmissions for ARQ where a receiver determines which data symbols should be retransmitted. For sake of clarity, in FIG. 9, it is assumed that a "transmitter" is a "base station" and a "receiver" is a mobile terminal. Method 900 is split into a method 901 performed by a base station and method 902 performed by a mobile terminal. Methods 901 and 902 are performed in parallel. Method 901 begins in step 905, when a base station transmits a frame. The base station waits for reception from the mobile terminal in step 910. When there is a reception, the base station determines whether the reception includes an Ack (acknowledge) or a Nack (no acknowledge) in step 915. If the reception includes an Ack (step 915=Ack), method 901 ends in step 930.

If the reception includes a Nack (step 915=Nack), it is assumed in this example that the reception further includes subcarrier indices (e.g., subcarrier indices 137 in FIG. 1) of the subchannels (or their corresponding data symbols) that should be retransmitted. In step 920, the base station constructs a block (e.g., data block 142 of FIG. 1) of data symbols that correspond to the subcarrier indices. Also in step 930, the base station retransmits the block. Generally a frame (e.g., frame 140 of FIG. 1) would be created and include one or more OFDM symbols containing the subchannels with the worst channel quality and new data in other OFDM symbols to make a complete frame.

In step 925, it is determined if the maximum number of retransmissions have been performed. If so (step 925=Max), method 901 ends in step 930. If not (step 925=<Max), the method 901 continues in step 910. An ordered retransmission module 120 of FIG. 1 would typically perform steps 920 and 925 of method 901 (although actual retransmission would be performed by other parts of the base station).

Method 902 is performed by the mobile terminal and at the same as method 901 is performed. In step 945, the mobile terminal waits to receive information and then receives information. In step 950, the mobile terminal determines channel estimates. In step 955, the channel quality parameters are determined as described above. Bit values may also be determined. The channel quality parameters and bit values will be combined as described above for each retransmission. In step 960, the mobile terminal determines whether an Ack or a Nack should be communicated to the base station. If an Ack is to be transmitted (step 960=Ack), an Ack is sent in step 990 and the method 902 ends in step 995. If a Nack should be communicated to the mobile terminal (step 960=Nack), it is determined in step 965 if the maximum number of retransmissions has been reached. If so (step 965=Max), an Ack is sent in step 990 and the method 902 ends in step 995.

If not (step 965=<Max), the mobile terminal determines the subcarrier indices of the subcarriers with the worst quality for the channel quality parameters. The mobile terminal does this so that when the base station retransmits the data symbols, the mobile terminal will have determined which data symbols are being retransmitted. In step 980, the mobile terminal sends the subcarrier indices (determined in step 970) to the base station. The method continues in step 945, as the mobile terminal waits for information from the base station.

Figure 10:
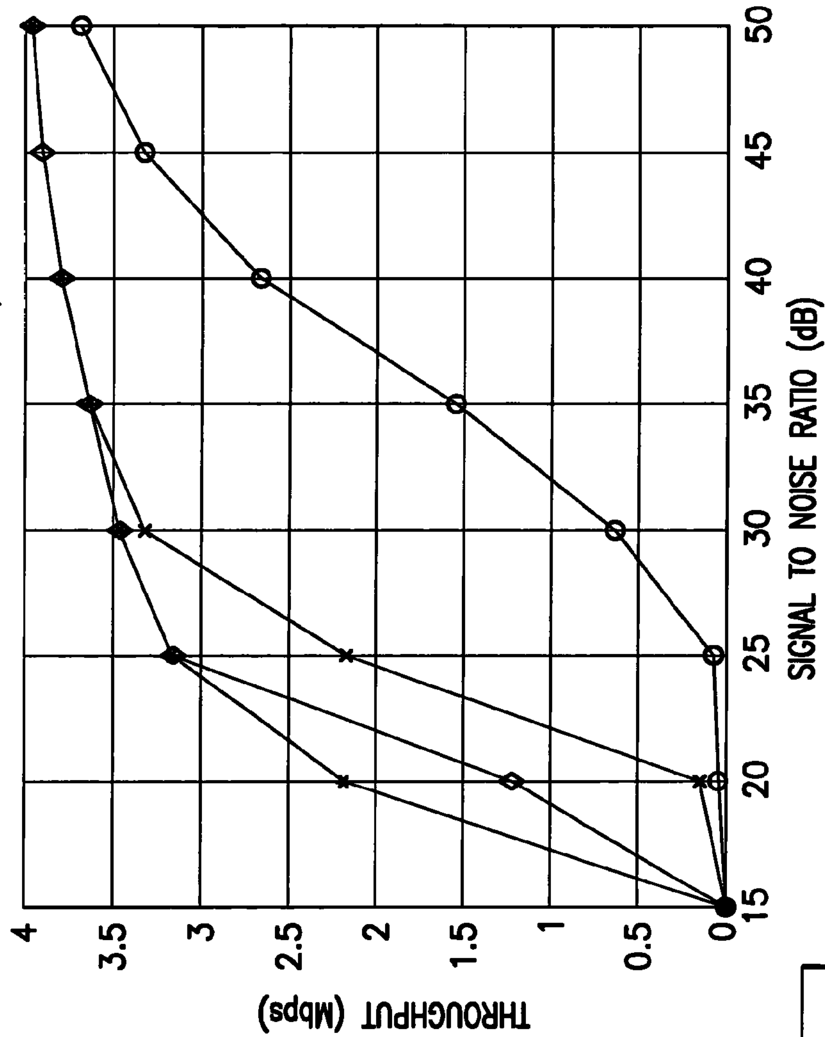
FIG. 10 is a graph comparing achievable throughputs by a narrowband OFDM system with ordered standard ARQ and different values of maximum retransmissions in block Vehicular A.

FIG. 10 compares the achievable throughputs by using the system of FIG. 5 but ordered retransmissions. One major difference between this figure and FIG. 5 is the significant gain achieved by allowing only one retransmission. This is an expected result, because by retransmission of the data symbols with the worst channel conditions, the likelihood of correcting all of the data symbol errors in the frame in only one retransmission is much higher than the sequential ARQ. We also observe that subsequent retransmissions can result in further improvement in the performance.

Figure 11:
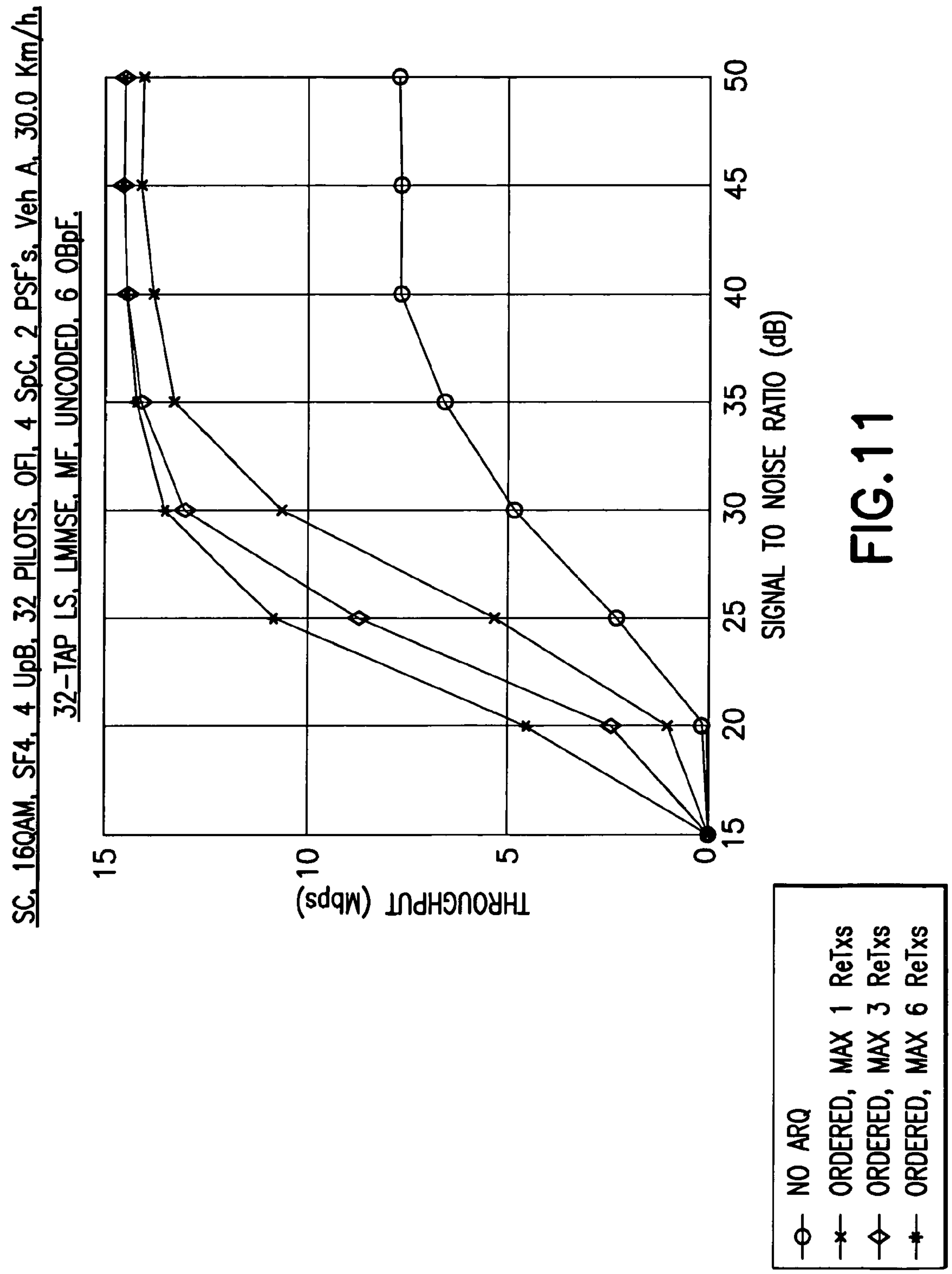
FIG. 11 is a graph comparing achievable throughputs by a wideband MC-CDMA system with ordered standard ARQ and different values of maximum retransmissions in ITU Vehicular A channel at 30 Km/h.
Figure 12:
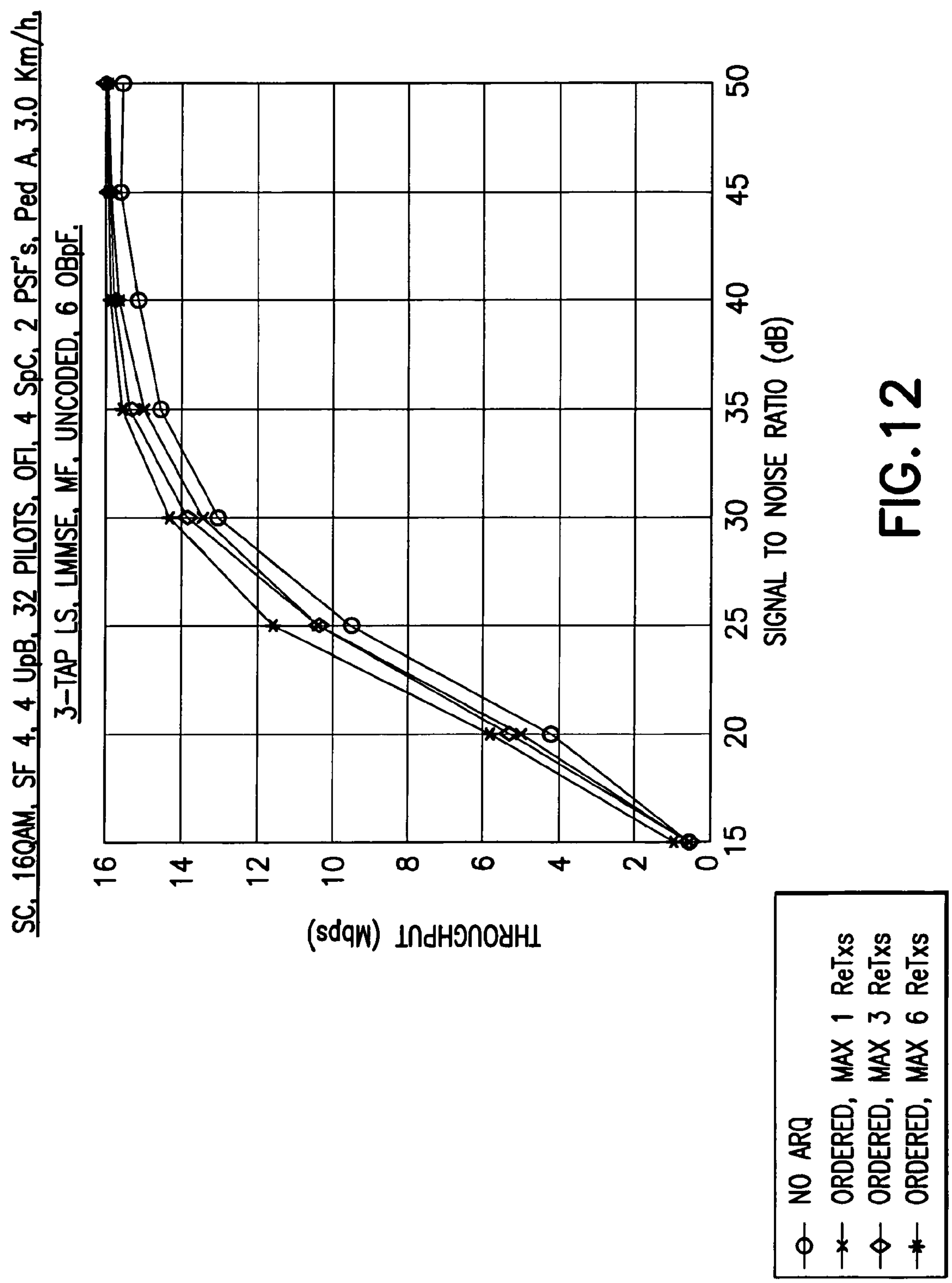
FIG. 12 is a graph comparing achievable throughputs by a wideband MC-CDMA system with ordered standard ARQ and different values of maximum retransmissions in ITU Pedestrian A channel at 3 Km/h.

FIG. 11 and FIG. 12 show similar results for the wideband MC-CDMA systems of FIG. 6 and FIG. 7 but with ordered retransmissions. An interesting result can be observed in FIG. 12, where unlike the case of sequential ARQ in FIG. 7, retransmissions of one or three OFDM symbols also result in performance improvement. This is also an expected result, for the same reason as explained above.

Performance Comparison

Figure 13:
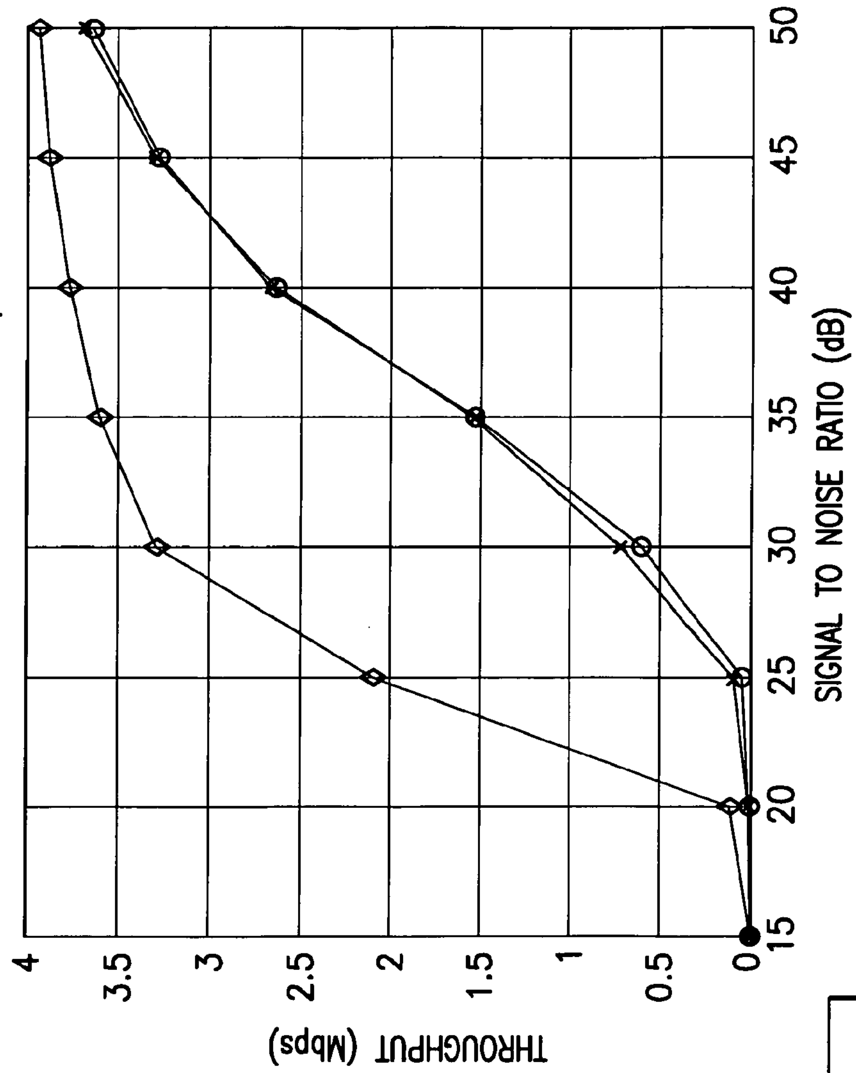
FIG. 13 is a graph comparing achievable throughputs by a narrowband OFDM system with sequential and ordered standard ARQ and maximum retransmissions of one in block Vehicular A channel.

FIG. 13 compares the performances of the sequential and ordered standard ARQ schemes for the narrowband OFDM system in block Vehicular A channel. The maximum number of retransmissions is assumed to be one. As we see, using ordered retransmissions provides substantial throughput gains, whereas the performance improvement from sequential ARQ scheme is negligible.

Figure 14:
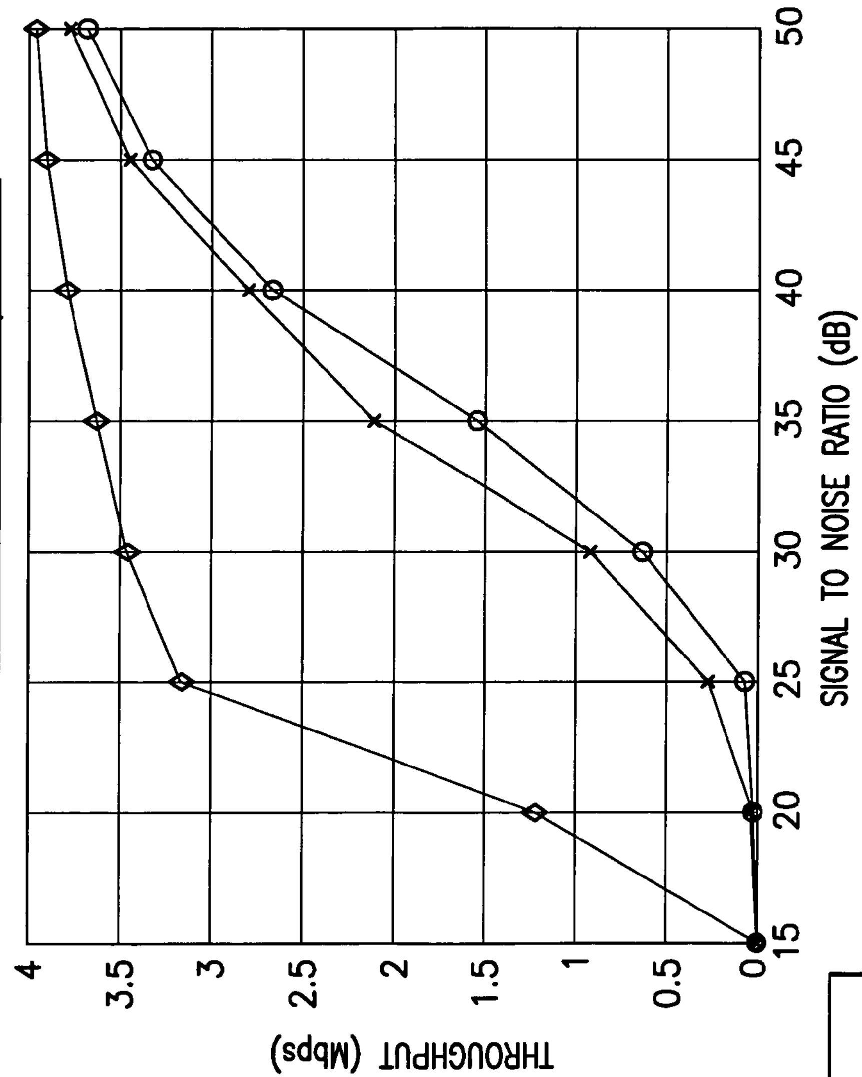
FIG. 14 is a graph comparing achievable throughputs by a narrowband OFDM system with sequential and ordered standard ARQ and maximum retransmissions of three in block Vehicular A channel.
Figure 15:
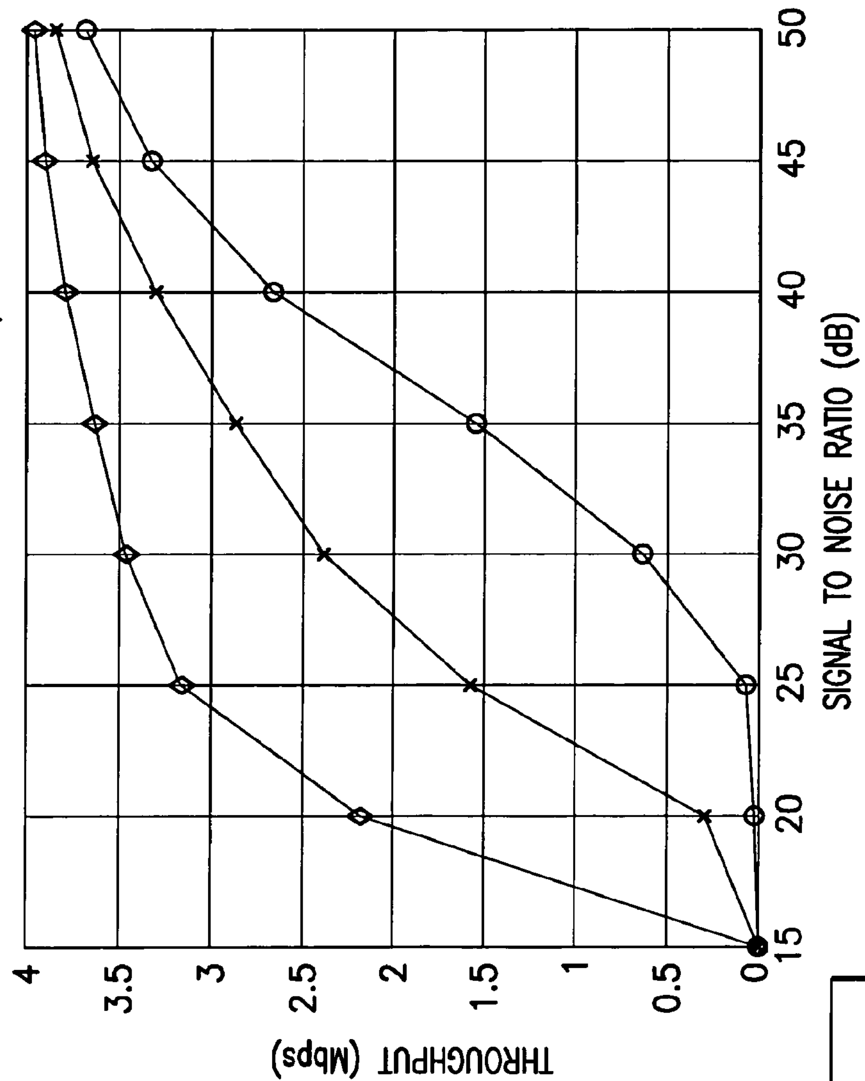
FIG. 15 is a graph comparing achievable throughputs by a narrowband OFDM system with sequential and ordered standard ARQ and maximum retransmissions of six in block Vehicular A channel.

FIG. 14 and FIG. 15 show similar comparisons with maximum number of retransmissions of three and six. In both cases, the ARQ scheme with ordered retransmissions shows significantly larger gains compared to the ARQ scheme with sequential retransmissions.

Figure 16:
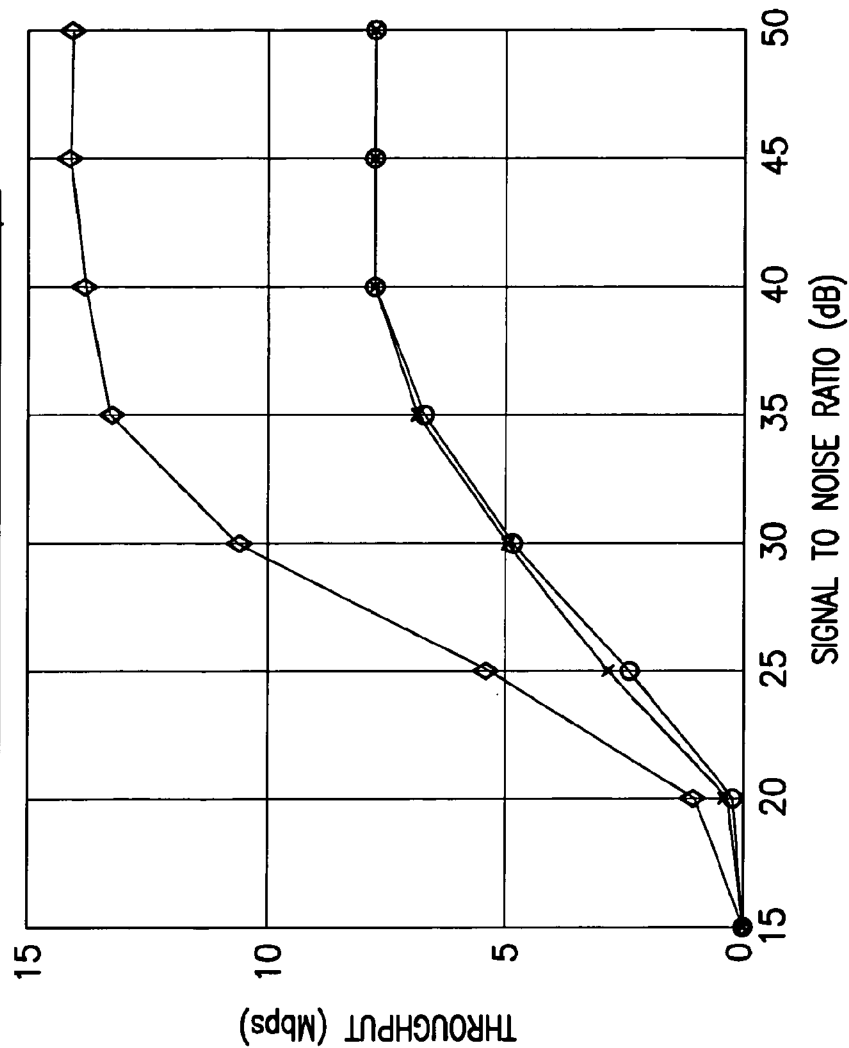
FIG. 16 is a graph comparing achievable throughputs by a wideband MC-CDMA system with sequential and ordered standard ARQ and maximum retransmissions of one in ITU Vehicular A channel at 30 Km/h.

FIG. 16 compares the performances of the sequential and ordered standard ARQ schemes for the wideband MC-CDMA system in Vehicular A channel at 30 Km/h. The maximum number of retransmissions is assumed to be one. As we see, ordered retransmissions provides substantial throughput gains, whereas the performance improvement from sequential ARQ scheme is negligible.

Figure 17:
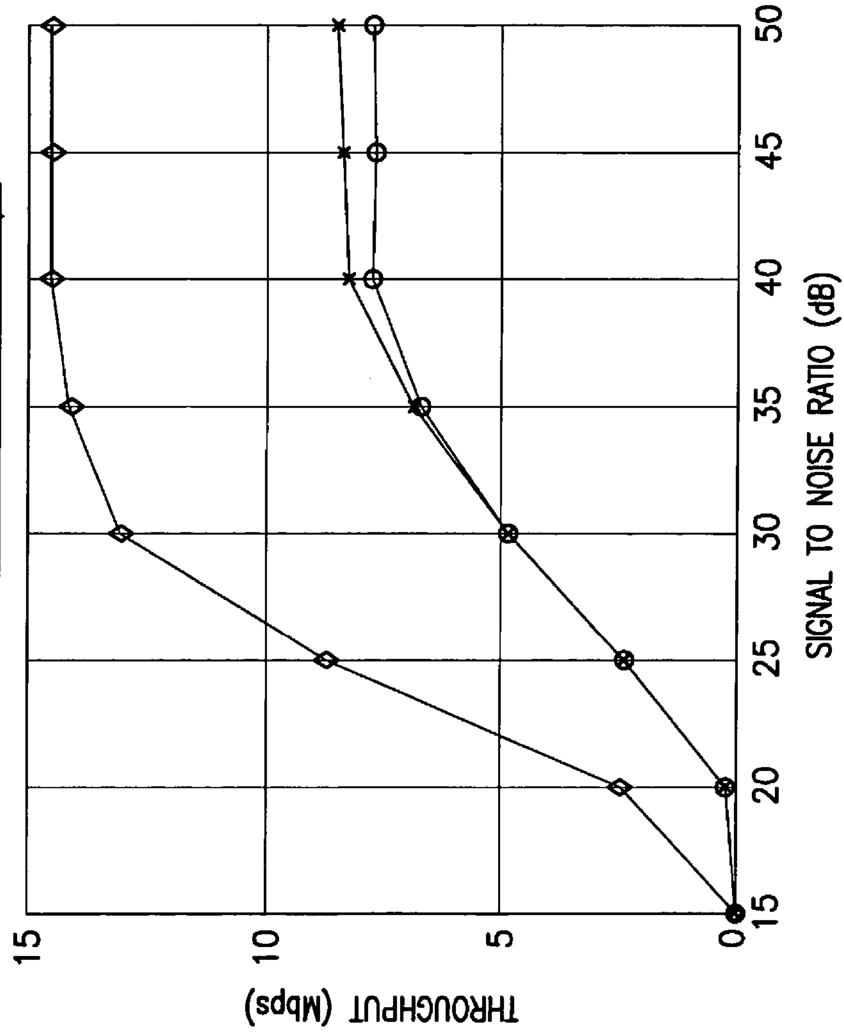
FIG. 17 is a graph comparing achievable throughputs by a wideband MC-CDMA system with sequential and ordered standard ARQ and maximum retransmissions of three in ITU Vehicular A channel at 30 Km/h.
Figure 18:
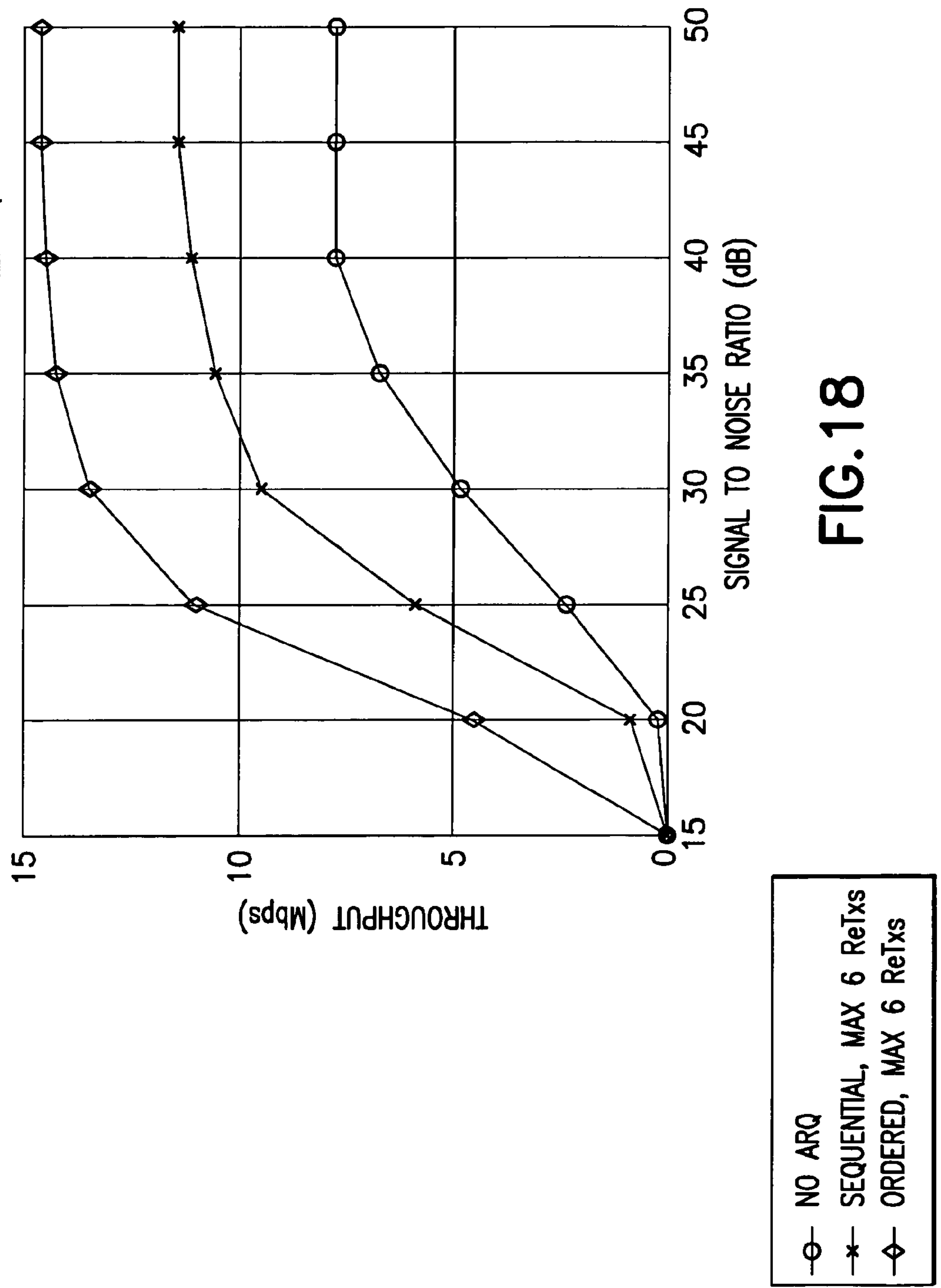
FIG. 18 is a graph comparing achievable throughputs by a wideband MC-CDMA system with sequential and ordered standard ARQ and maximum retransmissions of six in ITU Vehicular A channel at 30 Km/h.

FIG. 17 and FIG. 18 show similar comparisons with maximum number of retransmissions of three and six. In both cases, the ARQ scheme with ordered retransmissions shows significantly larger gains compared to the ARQ scheme with sequential retransmissions.

Figure 19:
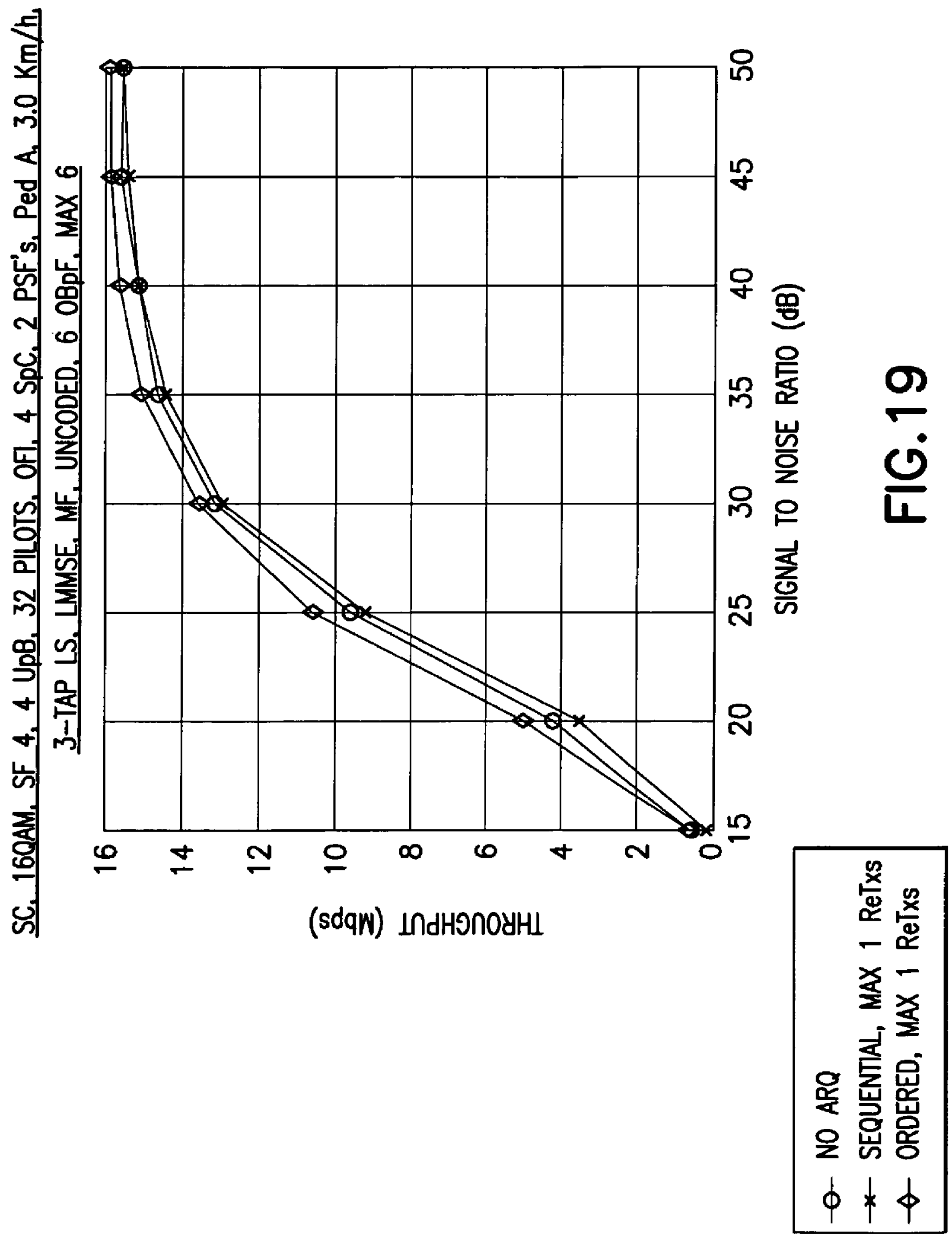
FIG. 19 is a graph comparing achievable throughputs by a wideband MC-CDMA system with sequential and ordered standard ARQ and maximum retransmissions of one in ITU Pedestrian A channel at 3 Km/h.
Figure 20:
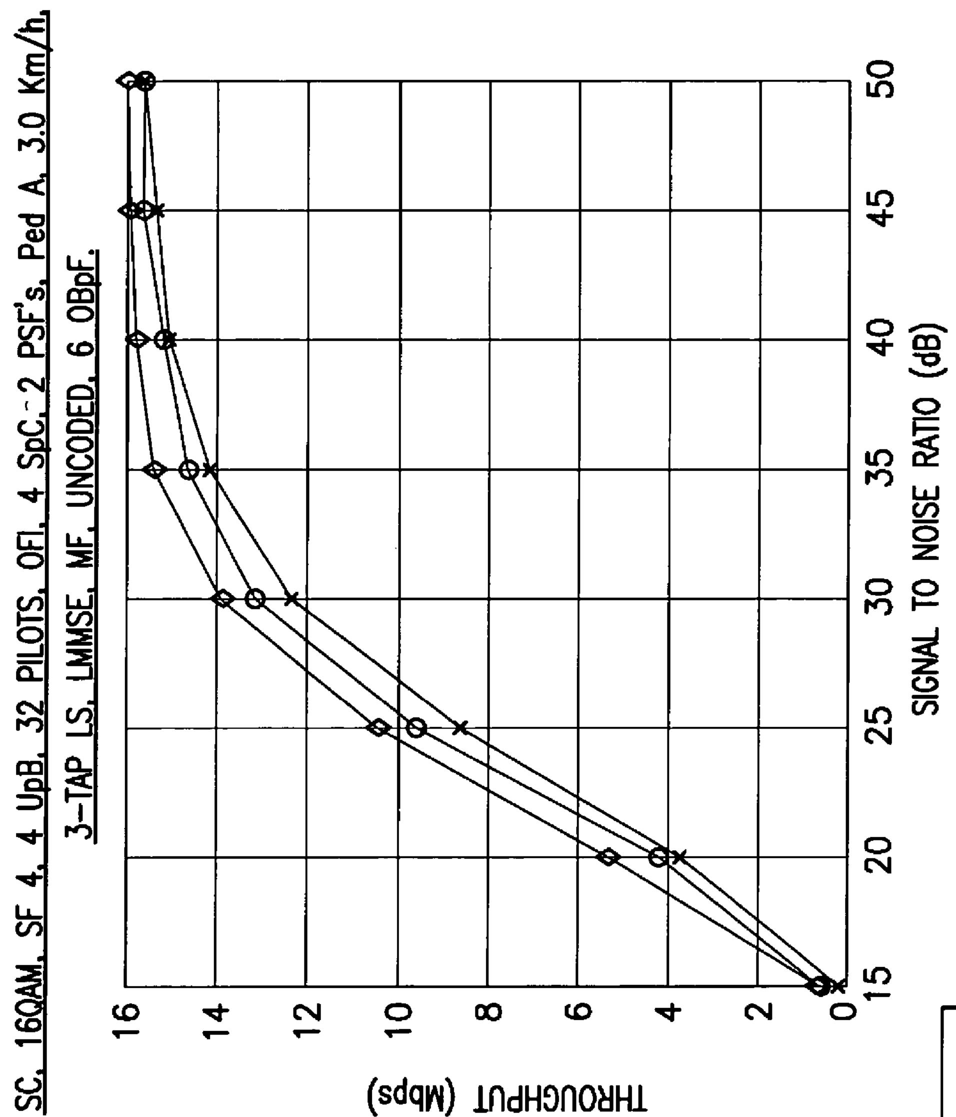
FIG. 20 is a graph comparing achievable throughputs by a wideband MC-CDMA system with sequential and ordered standard ARQ and maximum retransmissions of three in ITU Pedestrian A channel at 3 Km/h.

FIG. 19 and FIG. 20 compare the performances of the sequential and ordered standard ARQ schemes with maximum number of retransmissions of one and three, respectively, for the wideband MC-CDMA system in Pedestrian A channel at 3 Km/h. As we see, in both cases the ordered ARQ provides performance improvement, whereas the sequential ARQ results in reduced throughput. The reason has been explained in the sections entitled Sequential Retransmissions with Maximal Ratio Combining and Ordered Retransmissions with Maximal Ratio Combining.

Figure 21:
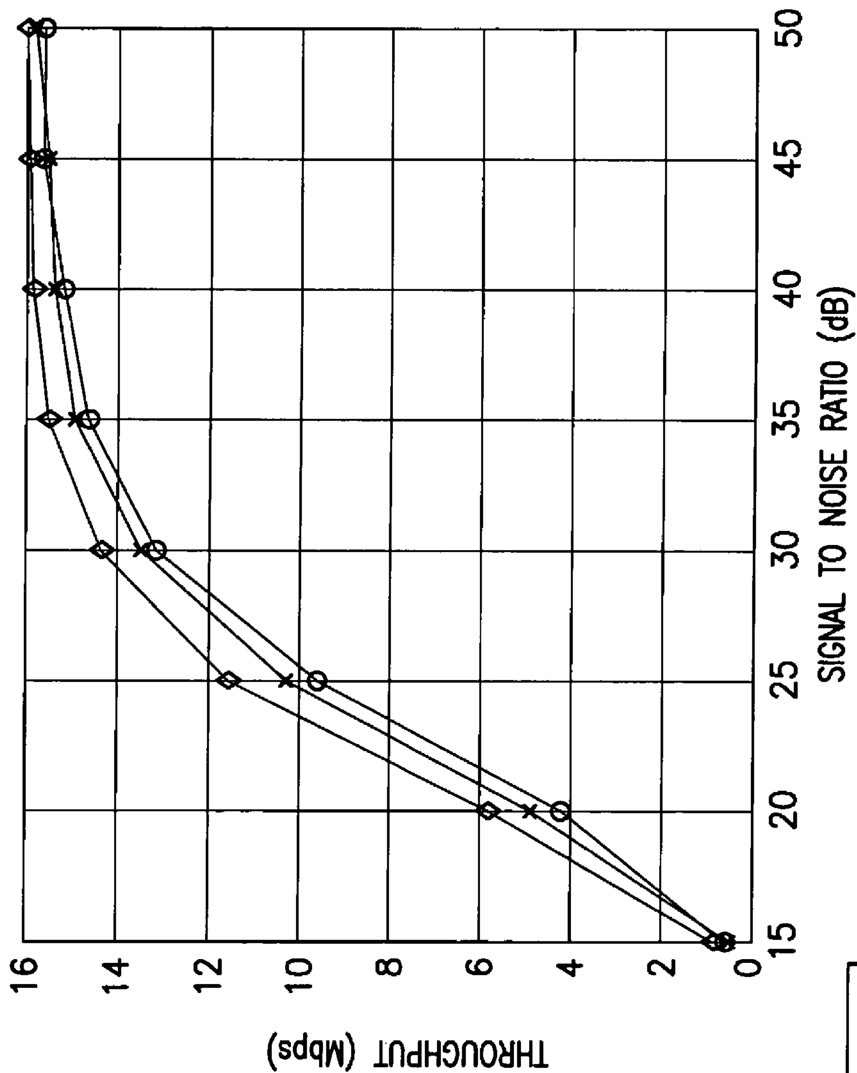
FIG. 21 is a graph comparing achievable throughputs by a wideband MC-CDMA system with sequential and ordered standard ARQ and maximum retransmissions of six in ITU Pedestrian A channel at 3 Km/h.

FIG. 21 shows similar comparisons with maximum number of retransmissions of six. In this case, both ARQ schemes provide performance improvement, however, the throughput gains from ordered ARQ are larger than gains achieved by sequential ARQ.

CONCLUSION AND ADDITIONAL COMMENTS

Figure 22B:
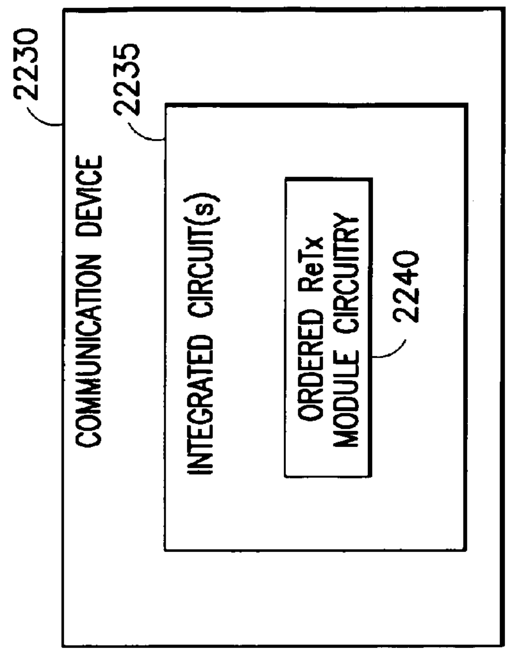
FIG. 22, including FIGS. 22A and 22B, includes block diagrams of exemplary implementations of a communication device for carrying out exemplary embodiments of the disclosed invention.
Figure 22A:
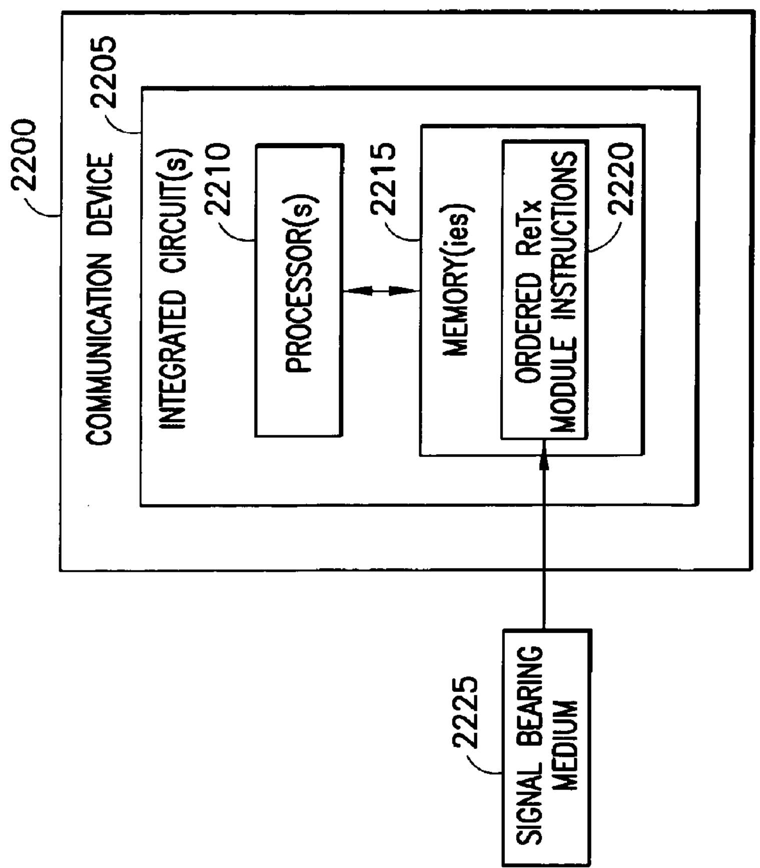

Referring now to FIG. 22A, a communication device 2200 (e.g., base station 110 or mobile terminal 155) is shown. Communication device 2200 includes one or more integrated circuits 2205 including one or more processors 2210 and one or more memories 2215. The one or more memories 2215 include an ordered retransmission module instructions set 2220. The ordered retransmission module instructions set 2220 is a program of machine-readable instructions executable by the one or more processors 2210 to carry out one or more of the operations described above (e.g., to perform ordered retransmission of data symbols). A signal bearing medium 2225 is also shown, which can be loaded into the one or more memories 2215. The signal bearing medium tangibly embodies a program of machine-readable instructions executable by a digital processing apparatus such as the communication device 2200 to perform one or more operations described herein.

FIG. 22B shows another example of a communication device 2230 (e.g., base station 110 or mobile terminal 155). In this example, the communication device 2230 includes one or more integrated circuits 2235 having ordered retransmission module circuitry 2240 that is configured to perform one or more operations to perform ordered retransmission of data symbols.

In general, the various embodiments of the mobile terminal can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The base station may include cellular phone base stations, wireless network base stations or access points, or any other device used to transmit. Further, a transmitter 115 could be part of a mobile terminal 155, while a receiver 165 be part of a base station 110.

The memory(ies) 2215 may be of any type suitable to the local technical environment and may be implemented using any suitable data storage technology, such as semiconductor-based memory devices, magnetic memory devices and systems, optical memory devices and systems, fixed memory and removable memory. The processor(s) 2210 may be of any type suitable to the local technical environment, and may include one or more of general purpose computers, special purpose computers, microcontrollers, microprocessors, digital signal processors (DSPs) and processors based on a multicore processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuits 2205 and 2235. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In this disclosure, we studied different ARQ algorithms for multicarrier systems. We considered standard ARQ algorithms with and without channel state information at the transmitter. We proposed ordered retransmissions of OFDM symbols of a frame with maximal ratio combining at the transmitter, and showed that such retransmissions provide significant gains in throughput compared to the sequential retransmissions. An exemplary non-limiting advantage of retransmitting a small part of a frame at a time instead of the whole frame is the increased throughput due to the decrease in the average amount of retransmitted data. The advantage of ordered retransmissions is also increased throughput due to the smaller number of required retransmissions per frame. A cost is the increased computation overhead at the transmitter and the receiver.

While there has been illustrated and described what are exemplary embodiments of the claimed invention, it will be appreciated that numerous changes and modifications are likely to occur to those skilled in the art. It is intended in the appended claims to cover all those changes and modifications that fall within the spirit and scope of the claimed invention. The term channel quality parameter in the claim includes at least both the OFDM channel quality and the MC-CDMA equivalent channel quality as described above.

What is claimed is:

1. A method comprising:

receiving from a transmitter a plurality of first data symbols using a plurality of subcarriers in a multicarrier system, the first data symbols being received in a plurality of first transmissions over the plurality of subcarriers;

determining a plurality of channel quality parameters, each of the channel quality parameters corresponding to at least one of the first data symbols;

when an error is associated with the first data symbols:

sending an automatic repeat request to the transmitter;

selecting a subset of the channel quality parameters exhibiting a worst quality as indicated by the determined channel quality parameters;

using the subset of the channel quality parameters, determining a corresponding subset of the first data symbols;

in response to at least one second transmission over the plurality of subcarriers, receiving a block of second data symbols corresponding to the subset of first data symbols, wherein each of the second data symbols prior to transmission comprises a copy of a corresponding one of the first data symbols prior to transmission; and using at least the first and second data symbols to determine values corresponding to the first data symbols in the subset of first data symbols;

wherein the channel quality parameters are first channel quality parameters;

and wherein using at least the first and second data symbols further comprises:

determining a plurality of second channel quality parameters, each of the second channel quality parameters corresponding to at least one second data symbol; and using the first and second channel quality parameters, combining the second data symbols with corresponding first data symbols in the subset of the first data symbols to determine values corresponding to the first data symbols in the subset of the first data symbols.

2. The method of claim 1, further comprising:

using the first channel quality parameters, determining subcarrier information; and transmitting the subcarrier information to a transmitter that transmitted the first data symbols.

3. The method of claim 2, wherein:

a frame is used to communicate the first data symbols, the frame comprising the plurality of first transmissions, wherein each subcarrier used in each of the first transmissions in the frame is assigned a unique index; and determining subcarrier information further comprises determining indices of the subcarriers that corresponding to the subset of the channel quality parameters exhibiting a worst quality as indicated by the determined channel quality parameters; and transmitting the subcarrier information further comprises transmitting the indices to the transmitter.

4. The method of claim 2, wherein:

each first data symbol is transmitted in a corresponding group of at least two subcarriers in one of the plurality of first transmissions;

a frame is used to communicate the first data symbols, the frame comprising the plurality of first transmissions, wherein each group of subcarriers used in each of the first transmissions in the frame is assigned a unique index;

determining subcarrier information further comprises determining indices of the groups of subcarriers that corresponding to the subset of the channel quality parameters exhibiting a worst quality as indicated by the determined channel quality parameters; and transmitting the subcarrier information further comprises transmitting the indices to the transmitter.

5. The method of claim 2, wherein:

determining subcarrier information further comprises determining channel estimates associated with the subcarriers and the plurality of first transmissions used to transmit the first data symbols; and transmitting the subcarrier information further comprises transmitting the channel estimates to the transmitter.

6. The method of claim 1, wherein a first frame is used to communicate the first data symbols and a second frame is used to communicate the second data symbols, the first frame comprising the plurality of first transmissions, the second frame comprising the at least one second transmission.

7. The method of claim 6, wherein each of the plurality of first transmissions comprises an Orthogonal Frequency Division Multiplexing symbol, and wherein each of the at least one second transmissions comprises an Orthogonal Frequency Division Multiplexing symbol.

8. The method of claim 6, wherein each of the first channel quality parameters corresponds to one of the subcarriers used during one of the transmissions of the first frame, wherein each of the first data symbols is communicated using one of the subcarriers in a transmission of the first frame, wherein each of the second channel quality parameters corresponds to one of the subcarriers used during one of the transmissions of the second frame, and wherein each second data symbol is communicated using one of the subcarriers in a transmission of the second frame.

9. The method of claim 6, wherein each of the first channel quality parameters corresponds to at least two of the subcarriers used during one of the transmissions of the first frame, wherein each first data symbol is communicated using at least two of the subcarriers in a transmission of the first frame, wherein each of the second channel quality parameters corresponds to at least two of the subcarriers used during one of the transmissions of the second frame, and wherein each second data symbol is communicated using at least two of the subcarriers in a transmission of the second frame.

10. An apparatus comprising:

a receiver comprising circuitry configured to receive a plurality of first data symbols using a plurality of subcarriers in a multicarrier system, the first data symbols being received in a plurality of first transmissions over the plurality of subcarriers;

the receiver further comprising a decoder configured to determine at least one error associated with the first data symbols;

a transmitter configured in response to the error determination to transmit an automatic repeat request;

the receiver further comprising an ordered retransmission module responsive to the error determination, the ordered retransmission module configured to determine a plurality of channel quality parameters, each of the channel quality parameters corresponding to at least one of the first data symbols, the ordered retransmission module further configured to select a subset of the channel quality parameters exhibiting a worst quality as indicated by the determined channel quality parameters, the ordered retransmission module further configured, using the subset of the channel quality parameters, to determine a corresponding subset of the first data symbols;

wherein the circuitry is further configured, responsive to at least one second transmission over the plurality of subcarriers, to receive a block of second data symbols corresponding to the subset of first data symbols, wherein each of the second data symbols prior to transmission comprises a copy of a corresponding one of the first data symbols prior to transmission;

wherein the ordered retransmission module is further configured to use at least the first and second data symbols to determine values corresponding to the first data symbols in the subset of first data symbols;

wherein the receiver comprises at least one memory and at least one processor coupled to the at least one memory, and wherein the ordered retransmission module is implemented at least in part through a plurality of instructions executable by the at least one processor.

11. The apparatus of claim 10, wherein the receiver comprises at least one integrated circuit and wherein the ordered retransmission module is implemented at least in part as circuit on the at least one integrated circuit.

12. A method comprising:

transmitting a plurality of first data symbols to a receiver using a plurality of subcarriers in a multicarrier system, the first data symbols transmitted using a plurality of first transmissions over the subcarriers;

receiving from the receiver subcarrier information corresponding to the subcarriers used to transmit the first data symbols, the subcarrier information further corresponding to a plurality of channel quality parameters, each of the channel quality parameters corresponding to at least one of the first data symbols;

using the subcarrier information, selecting a subset of the first data symbols that corresponds to a worst quality as indicated by the channel quality parameters;

constructing a block of second data symbols from the first data symbols in the subset of first data symbols; and transmitting the block of second data symbols using at least one second transmission over the plurality of subcarriers;

wherein the subcarrier information is first subcarrier information corresponding to at least one first channel quality parameter;

the method further comprising:

receiving second subcarrier information corresponding to the subcarriers used to transmit the block of second data symbols, the subcarrier information further corresponding to second channel quality parameters, each of the second channel quality parameters corresponding to at least one second data symbol;

using the second subcarrier information, selecting a subset of the second data symbols corresponding to a worst quality as indicated by the second channel quality parameters;

constructing a block of third data symbols from second data symbols in the subset of the second data symbols; and transmitting the block of third data symbols using at least one third transmission over the plurality of subcarriers.

13. The method of claim 12, further comprising:

receiving an automatic repeat request communication from the receiver, the automatic repeat request associated with the plurality of first data symbols; and in response to the automatic repeat request, constructing and transmitting the block of second data symbols.

14. The method of claim 12, wherein:

the first subcarrier information comprises first channel estimates corresponding to the subchannels used to transmit the first data symbols;

the second subcarrier information comprises second channel estimates corresponding to the subchannels used to transmit the second data symbols;

the method further comprises:

determining the at least one first channel quality parameter using the first channel estimates;

determining the at least one second channel quality parameter using the second channel estimates; and combining the first and second channel quality parameters to create combined channel quality parameters; and selecting a second subset of the subcarriers corresponding to a worst quality as indicated by the combined channel quality parameters.

15. A method comprising:

transmitting a plurality of first data symbols to a receiver using a plurality of subcarriers in a multicarrier system, the first data symbols transmitted using a plurality of first transmissions over the subcarriers;

receiving from the receiver subcarrier information corresponding to the subcarriers used to transmit the first data symbols, the subcarrier information further corresponding to a plurality of channel quality parameters, each of the channel quality parameters corresponding to at least one of the first data symbols;

using the subcarrier information, selecting a subset of the first data symbols that corresponds to a worst quality as indicated by the channel quality parameters;

constructing a block of second data symbols from the first data symbols in the subset of first data symbols; and transmitting the block of second data symbols using at least one second transmission over the plurality of subcarriers;

wherein:

a frame is used to transmit the first data symbols, the frame comprising the plurality of first transmissions, wherein each subcarrier used in each of the first transmissions is assigned a unique index; and the subcarrier information comprises indices corresponding to the subcarriers associated with the subset of channel quality parameters exhibiting a worst quality as indicated by the channel quality parameters; and selecting a subset of the first data symbols further comprises selecting the first data symbols that correspond to the indices.

16. A method comprising:

transmitting a plurality of first data symbols to a receiver using a plurality of subcarriers in a multicarrier system, the first data symbols transmitted using a plurality of first transmissions over the subcarriers;

receiving from the receiver subcarrier information corresponding to the subcarriers used to transmit the first data symbols, the subcarrier information further corresponding to a plurality of channel quality parameters, each of the channel quality parameters corresponding to at least one of the first data symbols;

using the subcarrier information, selecting a subset of the first data symbols that corresponds to a worst quality as indicated by the channel quality parameters;

constructing a block of second data symbols from the first data symbols in the subset of first data symbols; and transmitting the block of second data symbols using at least one second transmission over the plurality of subcarriers;

wherein:

each first data symbol is transmitted in a corresponding group of at least two subcarriers in one of the plurality of first transmissions;

a frame is used to transmit the first data symbols, the frame comprising the plurality of first transmissions, wherein each group of subcarriers used in each of the first transmissions is assigned a unique index; and the subcarrier information comprises indices corresponding to the groups of subcarriers associated with the subset of channel quality parameters exhibiting a worst quality as indicated by the channel quality parameters; and selecting a subset of the first data symbols further comprises selecting the first data symbols that correspond to the indices.

17. A method comprising:

transmitting a plurality of first data symbols to a receiver using a plurality of subcarriers in a multicarrier system, the first data symbols transmitted using a plurality of first transmissions over the subcarriers;

receiving from the receiver subcarrier information corresponding to the subcarriers used to transmit the first data symbols, the subcarrier information further corresponding to a plurality of channel quality parameters, each of the channel quality parameters corresponding to at least one of the first data symbols;

using the subcarrier information, selecting a subset of the first data symbols that corresponds to a worst quality as indicated by the channel quality parameters;

constructing a block of second data symbols from the first data symbols in the subset of first data symbols; and transmitting the block of second data symbols using at least one second transmission over the plurality of subcarriers;

wherein:

the subcarrier information comprises channel estimates corresponding to the subchannels used to transmit the first data symbols; and the method further comprises determining the channel quality parameters using the channel estimates; and selecting a subset of the first data symbols further comprises selecting the subset of first data symbols corresponding to subset of channel quality parameters having a worst quality as indicated by the determined channel quality parameters.

18. A method comprising:

transmitting a plurality of first data symbols to a receiver using a plurality of subcarriers in a multicarrier system, the first data symbols transmitted using a plurality of first transmissions over the subcarriers;

receiving from the receiver subcarrier information corresponding to the subcarriers used to transmit the first data symbols, the subcarrier information further corresponding to a plurality of channel quality parameters, each of the channel quality parameters corresponding to at least one of the first data symbols;

using the subcarrier information, selecting a subset of the first data symbols that corresponds to a worst quality as indicated by the channel quality parameters;

constructing a block of second data symbols from the first data symbols in the subset of first data symbols; and transmitting the block of second data symbols using at least one second transmission over the plurality of subcarriers;

wherein a first frame is used to communicate the first data symbols, the first frame comprising the plurality of first transmissions, and wherein a second frame is used to communicate the block of second data symbols, the second frame comprising the at least one second transmission.

19. The method of claim 18, wherein each of the transmissions in the first and second frames comprises an Orthogonal Frequency Division Multiplexing symbol.

20. The method of claim 18, wherein each of the at least one channel quality parameters corresponds to one of the subcarriers used during one of the first transmissions of the first frame, wherein each first data symbol is communicated using one of the plurality of subcarriers in one of the first transmissions of the first frame.

21. The method of claim 18, wherein each of the at least one channel quality parameters corresponds to at least two of the subcarriers used during one of the second transmissions of the second frame, wherein each second data symbol is communicated using at least two of the plurality of subcarriers in one of the second transmissions of the second frame.

22. An apparatus comprising:

a transmitter comprising circuitry configured to transmit a plurality of first data symbols using a plurality of subcarriers in a multicarrier system, the first data symbols transmitted using a plurality of first transmissions over the subcarriers;

a receiver configured to receive subcarrier information corresponding to the subcarriers used to transmit the first data symbols, the subcarrier information further corresponding to a plurality of channel quality parameters, each of the channel quality parameters corresponding to at least one of the first data symbols;

the transmitter further comprising an ordered retransmission module configured to use the subcarrier information to select a subset of the first data symbols that corresponds to a worst quality as indicated by the channel quality parameters, the ordered retransmission module further configured to construct a block of second data symbols from the first data symbols in the subset of first data symbols;

wherein the circuitry is further configured to transmit the block of second data symbols using at least one second transmission over the plurality of subcarriers; and wherein the transmitter comprises at least one integrated circuit and wherein the ordered retransmission module is implemented at least in part as circuitry on the at least one integrated circuit.

23. The apparatus of claim 22, wherein the transmitter comprises at least one memory and at least one processor coupled to the at least one memory, and wherein the ordered retransmission module is implemented at least in part through a plurality of instructions executable by the at least one processor.

24. A memory storing a program of machine-readable instructions executable by a digital processing apparatus to perform the operations of:

using subcarrier information to select a subset of a plurality of first data symbols that corresponds to a worst quality as indicated by channel quality parameters, the plurality of first data symbols transmitted using a plurality of subcarriers in a multicarrier system, the first data symbols transmitted using a plurality of first transmissions over the subcarriers, wherein the subcarrier information is received and corresponds to the subcarriers used to transmit the first data symbols, the subcarrier information further corresponding to a plurality of channel quality parameters, each of the channel quality parameters corresponding to at least one of the first data symbols;

constructing a block of second data symbols from the first data symbols in the subset of first data symbols; and causing the block of second data symbols to be transmitted using at least one second transmission over the plurality of subcarriers;

wherein:

a frame is used to transmit the first data symbols, the frame comprising the plurality of first transmissions, wherein each subcarrier used in each of the first transmissions is assigned a unique index; and the subcarrier information comprises indices corresponding to the subcarriers associated with the subset of channel quality parameters exhibiting a worst quality as indicated by the channel quality parameters; and the operation of selecting a subset of the first data symbols further comprises selecting the first data symbols that correspond to the indices.

25. A memory storing a program of machine-readable instructions executable by a digital processing apparatus to perform the operations of:

using subcarrier information to select a subset of a plurality of first data symbols that corresponds to a worst quality as indicated by channel quality parameters, the plurality of first data symbols transmitted using a plurality of subcarriers in a multicarrier system, the first data symbols transmitted using a plurality of first transmissions over the subcarriers, wherein the subcarrier information is received and corresponds to the subcarriers used to transmit the first data symbols, the subcarrier information further corresponding to a plurality of channel quality parameters, each of the channel quality parameters corresponding to at least one of the first data symbols;

constructing a block of second data symbols from the first data symbols in the subset of first data symbols; and causing the block of second data symbols to be transmitted using at least one second transmission over the plurality of subcarriers;

wherein:

the subcarrier information comprises channel estimates corresponding to the subchannels used to transmit the first data symbols; and the operations further comprise determining the channel quality parameters using the channel estimates; and the operation of selecting a subset of the first data symbols further comprises selecting the subset of first data symbols corresponding to subset of channel quality parameters having a worst quality as indicated by the determined channel quality parameters.

* * * * *